United States Patent [19]

Farrell et al.

[11] Patent Number: 5,182,800
[45] Date of Patent: Jan. 26, 1993

[54] DIRECT MEMORY ACCESS CONTROLLER WITH ADAPTIVE PIPELINING AND BUS CONTROL FEATURES

[75] Inventors: Joseph K. Farrell, Boca Raton, Fla.; Jeffrey S. Gordon, Centreville, Va.; Daniel C. Kuhl, Delray Beach; Timothy V. Lee, Boca Raton, both of Fla.

[73] Assignee: International Business Machines Corporation, Armonk, N.Y.

[21] Appl. No.: 614,524

[22] Filed: Nov. 16, 1990

[51] Int. Cl.[5] .............................................. G06F 13/14
[52] U.S. Cl. ................................. 395/425; 364/DIG. 1
[58] Field of Search ... 364/200 MS File, 900 MS File; 395/400 MS File, 425

[56] References Cited

U.S. PATENT DOCUMENTS

| | | | |
|---|---|---|---|
| 4,228,496 | 10/1980 | Katzman et al. | 395/200 |
| 4,272,819 | 6/1981 | Katsumata . | |
| 4,371,928 | 2/1983 | Barlow . | |
| 4,481,572 | 11/1984 | Ochsner | 395/325 |
| 4,604,683 | 8/1986 | Russ et al. | 395/425 |
| 4,646,236 | 2/1987 | Crockett . | |
| 4,716,523 | 12/1987 | Burrus, Jr. et al. | 395/425 |
| 4,809,155 | 2/1989 | Costes . | |
| 4,821,170 | 4/1989 | Bernick et al. | 395/275 |
| 4,979,104 | 12/1990 | Holtey et al. | 395/325 |
| 5,031,091 | 7/1991 | Wakatsuki et al. | 395/275 |

OTHER PUBLICATIONS

"DMA Controller Relieves Host of I/O Management" S. Searcy, Digital Design, May 1985, pp. 79, 86, 88, 90 & 92.
"DMA Rotating Queue 32-bit Address Generation", Brown et al., IBM Tech.Discl. Bulletin vol. 26, No. 2, Jul. 1983, pp. 553-554.
"Pipelined Data Flow In A Communications Adapter", Miller, IBM Tech.Discl. Bulletin, vol. 22, No. 6, Nov. 1979, pp. 2214-2215.

Primary Examiner—Joseph L. Dixon
Assistant Examiner—Reba I. Elmore
Attorney, Agent, or Firm—Winfield J. Brown, Jr.; Romualdas Strimaitis

[57] ABSTRACT

An improved multi-channel direct memory access (DMA) controller for data processing systems provides adaptive pipelining and time overlapping of operations performed relative to communication channels. Registers and resources used to pipeline communication data and control signals relative to plural channels are adaptively shared relative to a single channel when command chaining is required relative to that channel. In command chaining a plural word command, termed a Device Control Block (DCB), is fetched from an external system memory via a bus having severe time constraints relative to potential real time requirements of the channels. Pipelining and time overlapping of channel operations, relative to plural channels, increases the effective rate of transfer at the bus interface to the system memory, and thereby allows for the controller to be used for applications in which throughput requirements and bus access constraints could otherwise conflict.

12 Claims, 12 Drawing Sheets

Fig. 3   (Prior Art)
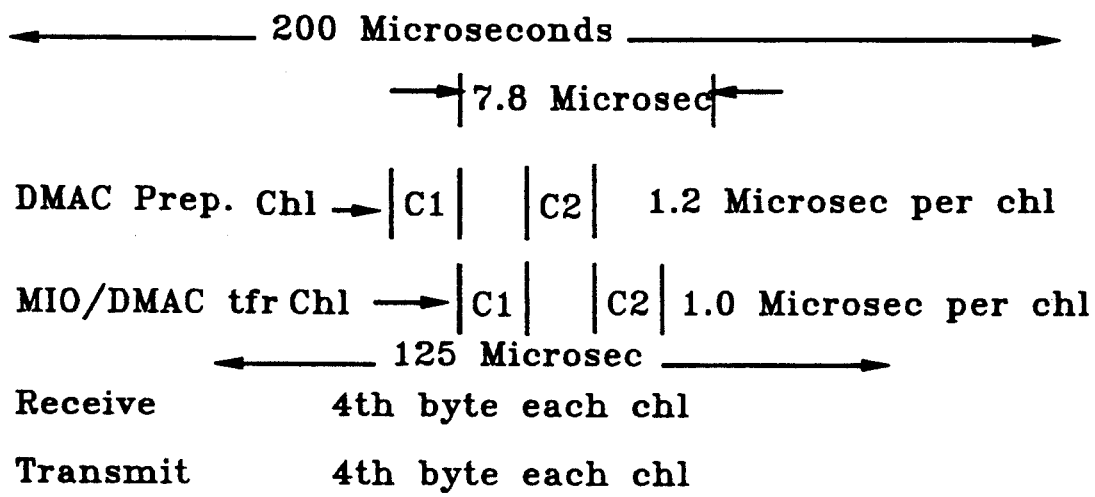
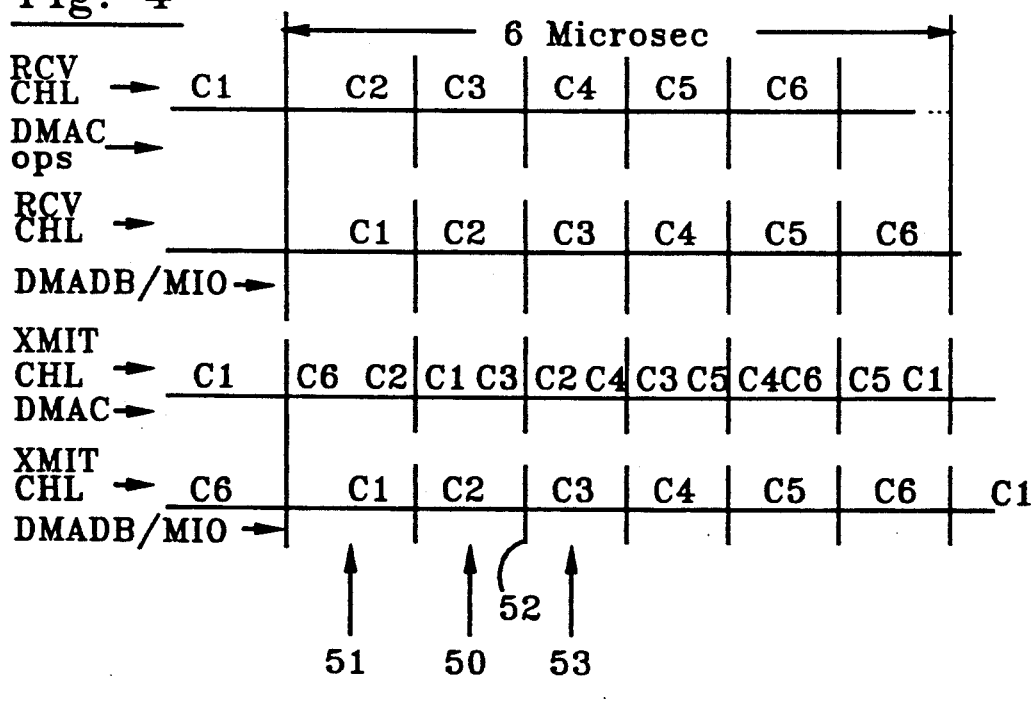
Fig. 4

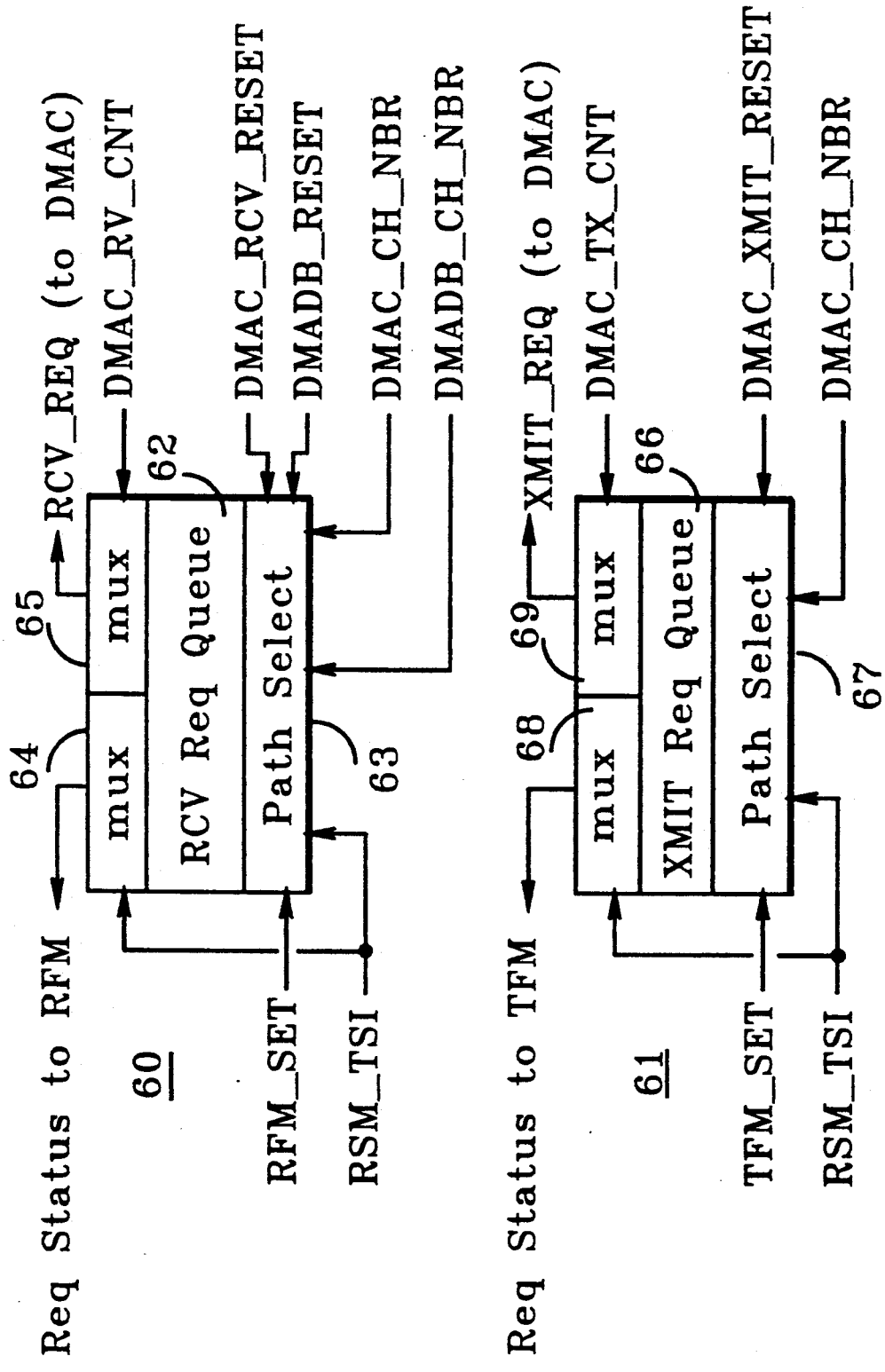
Fig. 7 (DMARQ)

Fig. 8 (FIFO RAM)
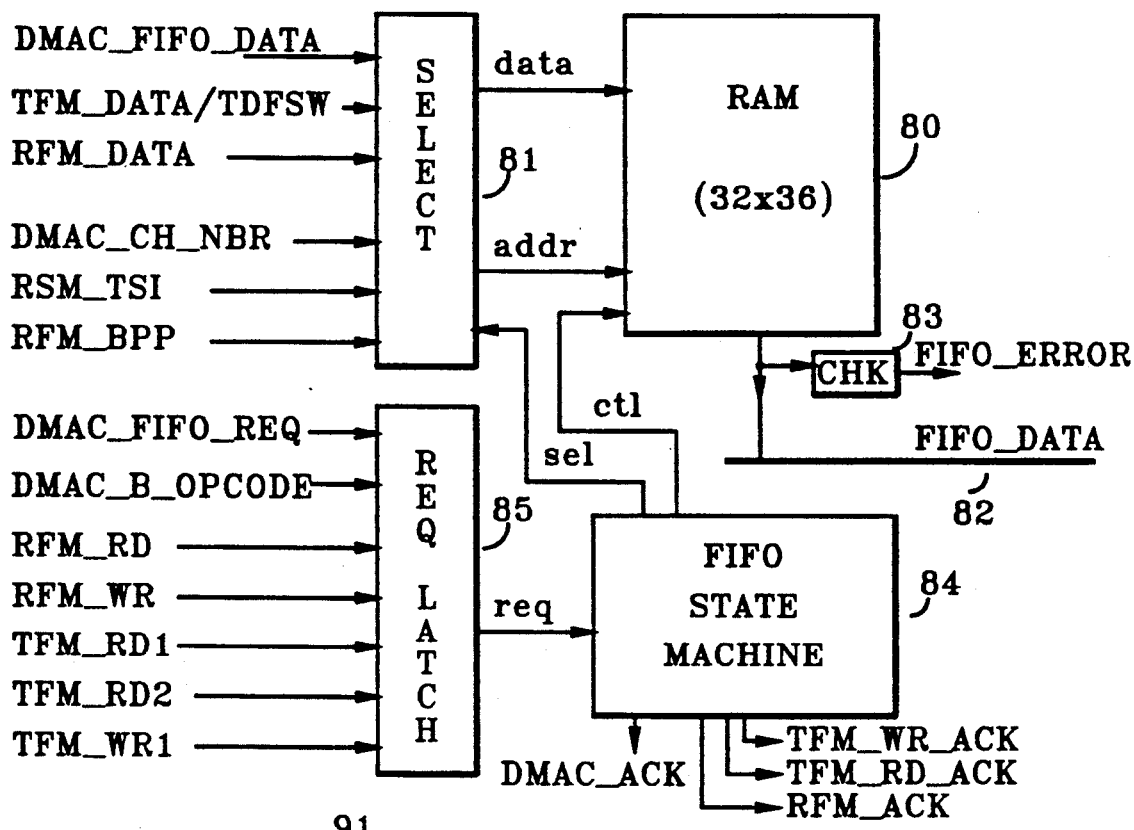
Fig. 9 (DMACR)
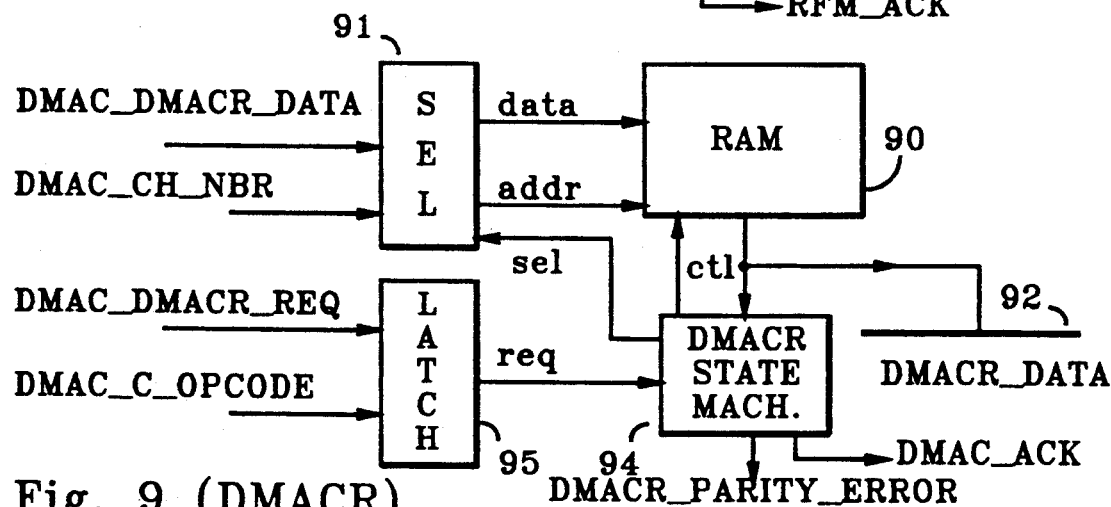

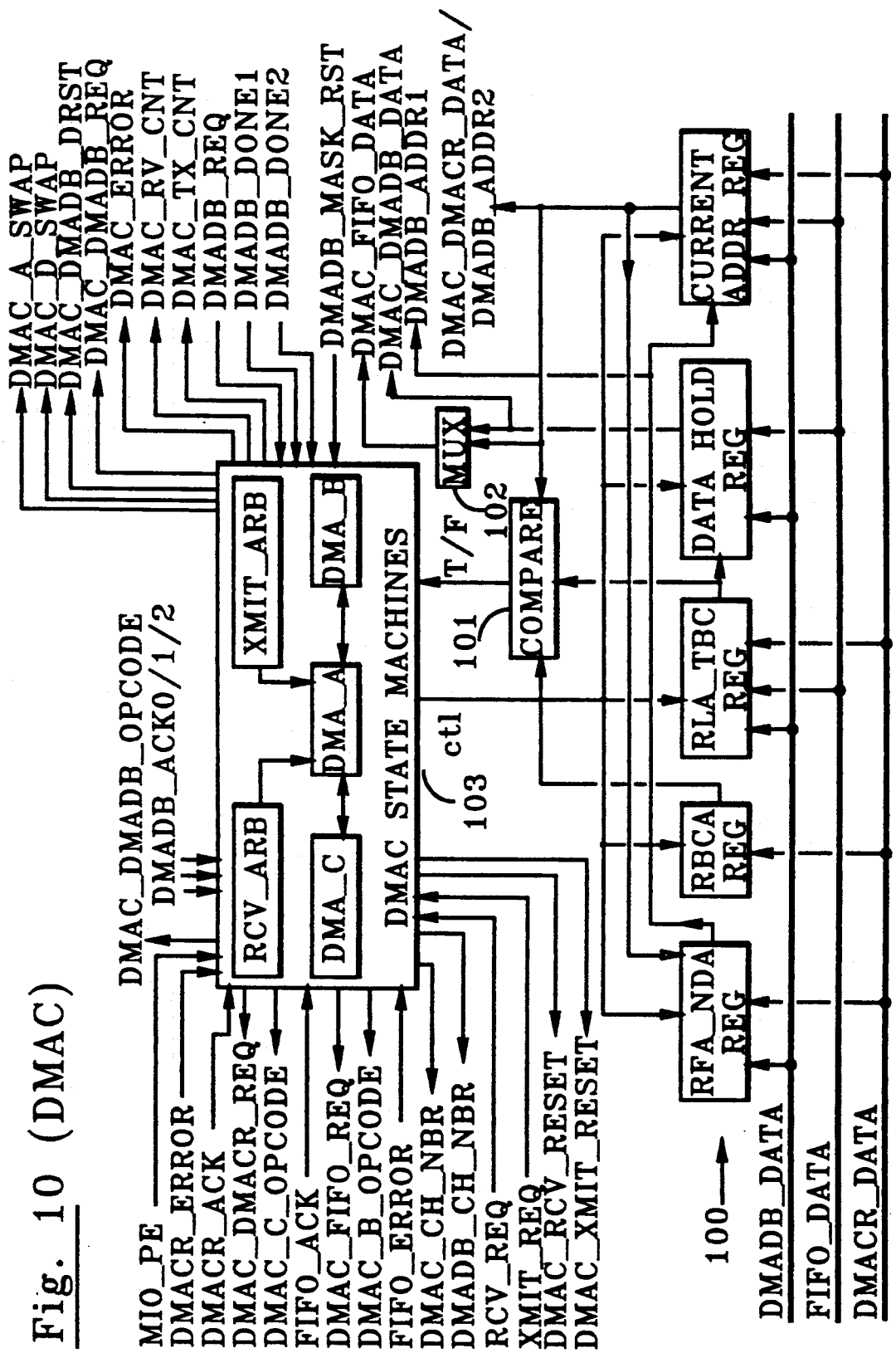
Fig. 10 (DMAC)

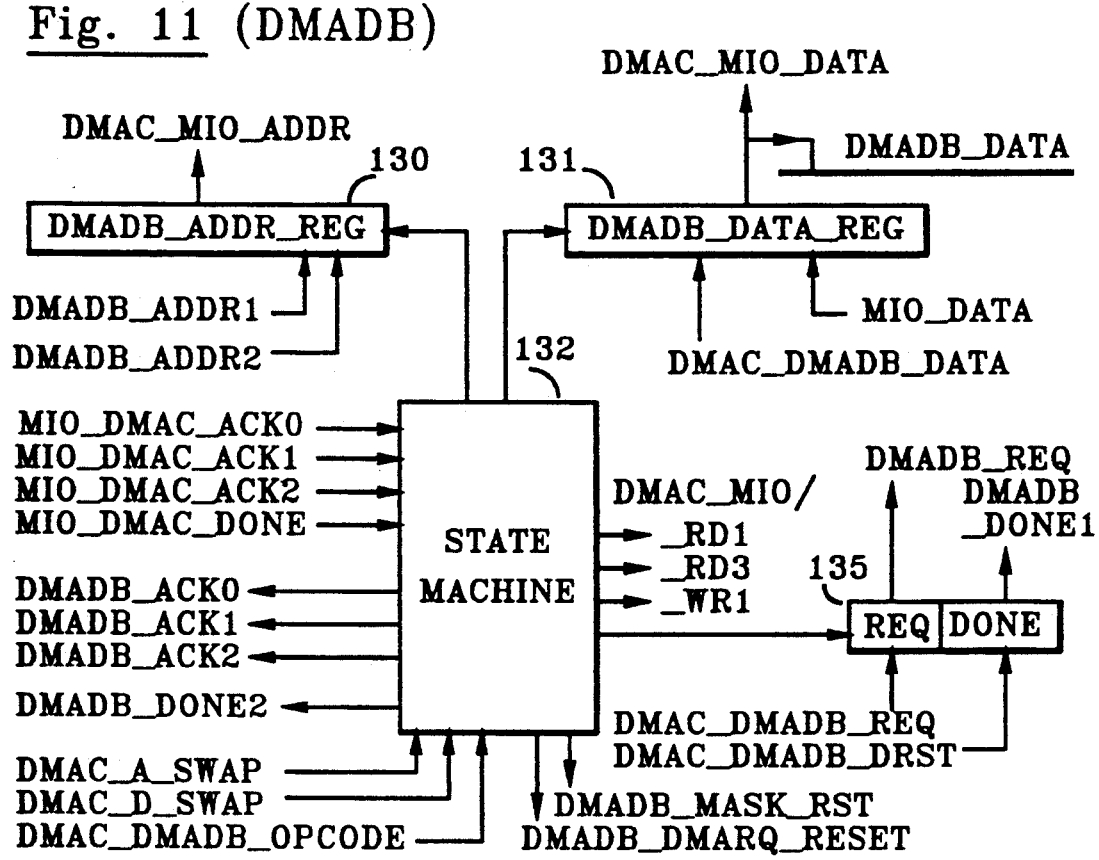
Fig. 11 (DMADB)
Fig. 16 DMAC FUNCTIONAL REGISTER
| DMA B REQ (1) | DMA B OPCODE (3) | DMA C REQ (1) | DMA C OPCODE (2) | DMAC DMADB OPCODE (2) | RCV-XMIT (1) | DMAC MASK (1) | DMADB MASK (1) | DMAC CHN NBR (3) | DMADB CHN NBR (3) | DMACR PE (1) | FIFO PE (1) |
|---|---|---|---|---|---|---|---|---|---|---|---|

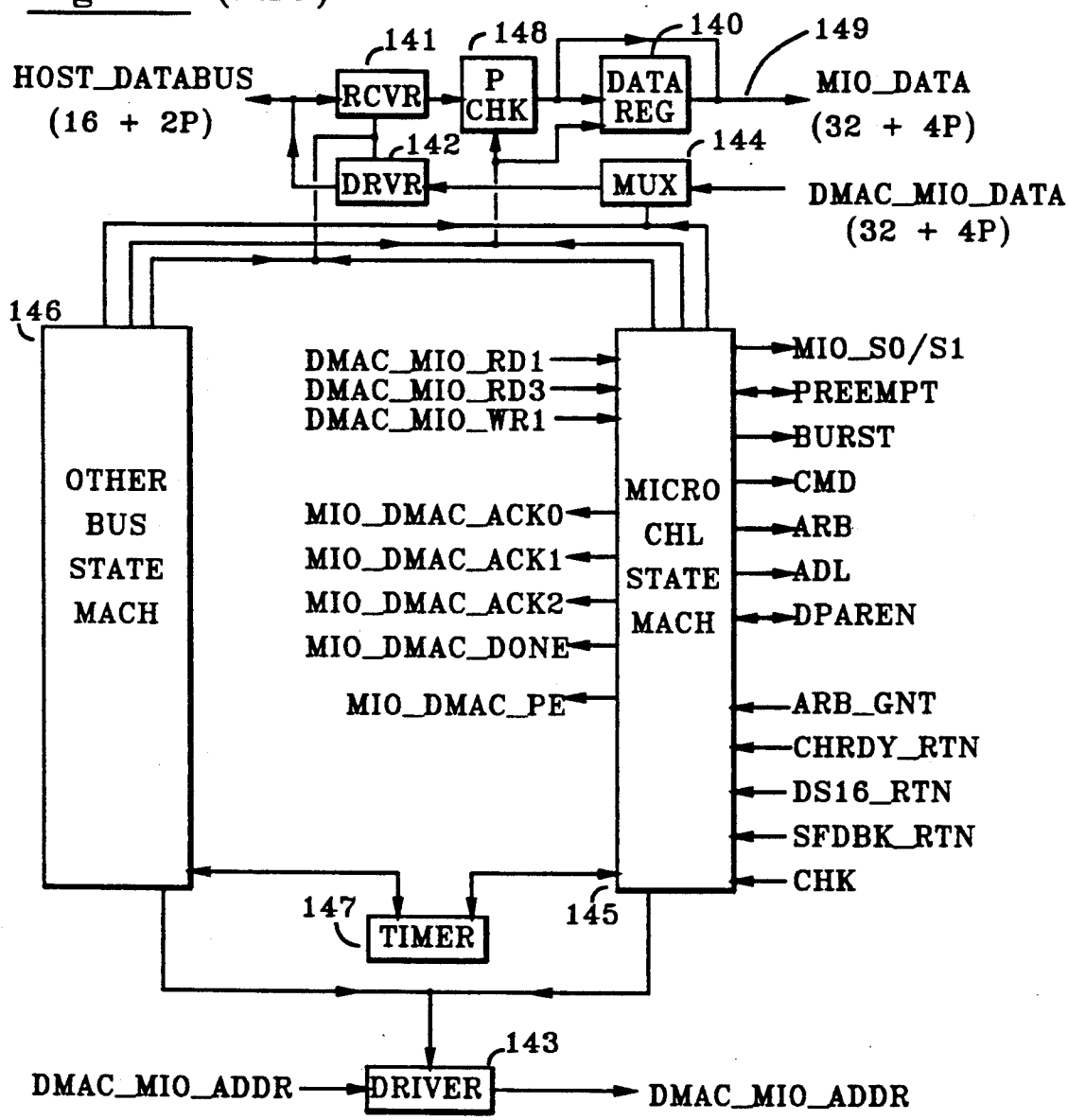
Fig. 12 (MIO)

Fig. 14

| | | | | | | | | TDCR1 |
|---|---|---|---|---|---|---|---|---|
| ECD (1) | EFD (1) | RES (1) | NDI (1) | TBC (2) | TOPQ (2) | PE (2) | RES (6) | TDBC (16) |

| | | | | TDCR2 |
|---|---|---|---|---|
| TDB1 (8) | TDB2 (8) | TDB3 (8) | TDB4 (8) |

TDBn: Transmit Data Byte n (n = 1-4)

| | | TDCR3 |
|---|---|---|
| RES (8) | TDBA (24) |

RES: Reserved
TDBA: Transmit Data Buffer Address

| | | | | TDCR4 |
|---|---|---|---|---|
| ECI (1) | EFI (1) | RES (8) | DCBA (20) | RES (2) |

ECI: Programmed End Of Chain Indicator
EFI: Programmed End Of Frame Indicator
RES: Reserved
DCBA: Next DCB Address

Fig. 15

| RES (8) | RBC (1) | RPE (1) | RDCA (22) | RDCR1 |

RES: Reserved
RBC: Receive Boundary Check
RPE: Receive Parity Error
RDCA: Receive Data Buffer Current Address

| RDB1 (8) | RDB2 (8) | RDB3 (8) | RDB4 (8) | RDCR2 |

RDBn: Receive Data Byte n (n = 1-4)

| RES (2) | RDLAH (8) | RDFA (22) | RDCR3 |

RES: Reserved
RDLAH: Receive Data Last Address High
RDFA: Receive Data Buffer First Address

| RDLAL | RDBA | RDCR4 |

RDLAL: Receive Data Last Address Low
RDBA: Receive Data Buffer Boundary Address

DIRECT MEMORY ACCESS CONTROLLER WITH ADAPTIVE PIPELINING AND BUS CONTROL FEATURES

FIELD OF THE INVENTION

This invention relates to direct memory access (DMA) controllers for data processing systems.

RELATED PATENT APPLICATIONS

Patent applications by J. K. Farrell et al listed below, both filed on Mar. 15, 1990 and assigned to the assignee of the present invention, disclose an integrated data link communication controller (IDLC) device operating between multiple communication ports and a bus associated with an external (host) processing system. The IDLC, which is packageable on a single VLSI (large scale integrated) circuit chip and is particularly useful for Integrated Services Digital Network (ISDN) applications, contains a pair of logical units for controlling access to the host system memory via the bus. These include an MIO (Master I/O) unit for obtaining access to the system bus as a bus master, and a DMAC (Direct Memory Access Controller) unit for directing operations of the MIO unit and overseeing DMA access to system memory via the MIO unit. The present invention is directed to improvements of the device subsection formed by the DMAC and MIO units disclosed in these earlier applications. The applications are:
1. Application Ser. No. 07/495,232 entitled Integrated Data Link Controller With Autonomous Logical Elements; and
2. Application Ser. No. 07/495,810 entitled Integrated Data Link Controller With Synchronous Link Interface And Asynchronous Host Processor Interface.

BACKGROUND OF THE INVENTION

The IDLC device comprises synchronous and asynchronous sections, interfacing respectively to communication ports and the mentioned system bus. The DMAC and MIO units mentioned above are in the asynchronous section. Intended for primary rate ISDN applications, the IDLC was designed to provide service to a large number of communication channels (as many as 32 channels full duplex, each operating at a rate of 64 kbps-64,000 bits per second-in each direction of communication).

A problem giving rise to the present invention was detected during design of a VLSI device related to the IDLC as a functional and logical subset of the latter. This device, termed the Integrated ISDN Module (or IIM), was designed principally for basic rate ISDN applications with capability of serving on the order of 6 full duplex basic rate channels (64 kbps in each communication direction). The intent was for the IIM to be used as a component of a communication card, and provide master bus control and DMA control relative to a number of different external system buses; including buses operating in accordance with the IBM Micro Channel[1] architecture.

[1]IBM and Micro Channel are trademarks of the International Business Machines Corporation.

The problem was detected in considering a prototype design for the IIM based on usage of DMAC and MIO units corresponding directly to those in the IDLC (but configured to serve 6 full duplex communication channels instead of 32 channels). Investigation reveals that this configuration could operate marginally under worst case assumptions regarding Micro Channel bus loading and channel activity in the device. Under worst case bus load circumstances (maximum number of devices connected to the bus and all assumed to be arbitrating for the bus at maximum rates), the IIM would have access to the bus only at intervals of about 200 microseconds (from the time it begins arbitrating for access) and would be allowed to retain access to the bus for only 7.8 microseconds each time that it gained access.

Worst case channel activity assumptions envision all 12 channels in the IIM device (6 receive channels and 6 transmit channels) requesting data word (32 bits) transfers from DMAC simultaneously. This condition occurs when data word storage spaces in the device local memory (FIFO RAM) allocated to all receive channels are simultaneously full and data word storage spaces allocated to all transmit channels are simultaneously empty. Under these conditions, and considering other latency factors due to pipelining in the device synchronous section (effectively providing buffer storage of up to 4 more bytes of data per channel), the DMAC and MIO would have 500 microseconds of additional time to transfer 12 data words relative to FIFO RAM before incurring overrun errors in one or more receive channels or underrun errors in one or more transmit channels.

The 500 microsecond limitation can be understood by considering that if all 12 channels were actively operating at the contemplated maximum rate of 64 kbps (64000 bits per second), each receive channel would receive a byte on the average every 125 microseconds, and transmit channel would transmit a byte every 125 microsecond. Thus, each receive/transmit channel would receive/send 4 bytes (the buffer capacity available to it in the synchronous section pipeline) every 500 microseconds. Thus, from the time a receive/transmit channel fills/empties its respective buffer in FIFO RAM, DMAC/MIO have only 500 microseconds to transfer respective receive data between FIFO RAM and host memory before error is charged. Accordingly, if all 12 buffers in FIFO RAM are simultaneously ready for transfers, DMAC/MIO have only 500 microseconds to carry out 12 respective word transfers between FIFO RAM and host memory. Now if the foregoing 12 transfers are to be made over a maximally loaded Micro Channel system bus, DMAC/MIO would have access to the bus for only 15.6 microseconds in any 500 microsecond interval (based on worst case access of 7.8 microseconds every 200 microseconds, and noting that 500 microseconds would encompass only two 7.8 microsecond accesses).

However, DMAC and MIO as designed for the IDLC are tightly time-interlocked units, requiring approximately 2.2 microseconds to carry out a word transfer (about 1.2 microseconds for DMAC to prepare needed instruction information and about 1.0 microseconds for MIO to control the associated data transfer at the bus). Thus, in 7.8 microseconds at most 4 word transfers could be completed (assuming that the 1.2 microseconds of preparation for the first transfer is carried out before MIO holds the bus, so that a first word could be transferred in the first 1 microsecond of access, and assuming that three more words could be transferred in the remaining 6.6 microseconds).

The original DMAC and MIO designs did not allow overlapping in time of preparational functions relative to one channel with the data transfer functions of another channel because of the available registers in the DMAC, their usage in the preparation and data transfer processes and time interdependencies between the DMAC and MIO relative to such usage.

Time constraints of the worst case scenario envisioned above—need to carry out 12 data word transfers on a maximally loaded Micro Channel bus relative to 12 simultaneously "ready" channels in 400 microseconds—become more severe when special functions such as command chaining are required. The IDLC was designed to provide command chaining service relative to transmit channels. In such operations 3 words of DCB (Device Control Block) information, representing commands chained to previously executed commands, must be fetched from host memory to local device memories (FIFO RAM and DMAC RAM). If the DCB fetches are not handled quickly, after exhaustion of the previous command is detected, in order to maintain continuity of operation in respective transmit channels (i.e. avoid underruns). Thus, if need for one or more command chain DCB fetches arises when the 12 channels are "ready", the DMAC and MIO would have to handle 15 or more word transfers in a 500 microsecond interval. However, taking into account the probability of having command chaining requirements coincide with ready conditions in all channels, and the probability of a bus being maximally loaded (so that arbitration contention is virtually continuous, which is the condition under which each device holding the bus is limited to 7.8 microseconds of use), it was determined that a reasonably "safe" design target for the IIM would be to accommodate handling of 12 ready channels in any 400 microsecond period of Micro Channel bus operation.

OBJECTS OF THE INVENTION

Accordingly, an object of the present invention is to provide an improved multi-channel DMA controller for providing efficient channel service between a system bus and multiple ports and/or devices which have high throughput real time data transfer requirements capable of conflicting with real time access constraints of the system bus.

Another object is to provide an improved DMA controller, as just stated, as an integrated portion of a multi-channel communication controller device. A related object is to provide an improved DMA controller, as an integral element of a communication controller which in turn is packaged on a single VLSI circuit chip, and wherein the improvements are provided within a framework of VLSI chip cost and cell count constraints which tightly limit the size of the DMA controller circuits.

SUMMARY OF THE INVENTION

These and other objects are achieved by replacing the DMA controller (DMAC) unit of the earlier IDLC device with two IIM units capable of operating in time overlap relative to different channels—an IIM DMAC unit and an IIM DMADB (Direct Memory Access Data Buffer Unit—and providing a modified MIO unit for purposes to be described.

The IIM DMAC unit interfaces between the IIM local memories (FIFO RAM and DMAC RAM) and DMADB, and DMADB and the modified MIO operate in tight coordination to control data and DCB transfers relative to host memory over the Micro Channel bus. The IIM DMAC and DMADB are only loosely coordinated in time, so that while DMAC prepares information for a transfer relative to one channel, DMADB and MIO can be carrying out a previously prepared transfer. As a result, the IIM can realize an effective transfer rate relative to the bus of about one word per microsecond, or about 15 words in a worst case limit of 15.8 microseconds of access time over any 400 microsecond interval. Thus, in any 400 microsecond interval, the IIM can effectively handle at least one command chain DCB fetch process together with transfers of data relative to 12 simultaneously ready channels; amply meeting the above design target.

The DMAC and DMADB units in the IIM operate in time overlap relative to different channels, so that while the DMA is preparing control information for a data transfer relative to one channel, the DMADB may be operating to carry out a data transfer to or from host system memory relative to another channel. Furthermore, these units swap information at discrete instants of time, so that when DMADB has completed a fetch of "transmit" data relative to one channel it can hand over that data to the DMAC, while receiving instruction information from the DMAC relative to a data transfer to be conducted relative to another channel (with associated receive data if the required transfer is relative to a receive channel).

Registers in DMAC and DMADB, which serve to buffer receive and transmit data, also form a buffer pipeline relative to each channel which effectively increases the time allowed for completing worst case data transfers over the system bus. This pipeline is used in an "adaptive" sense in that the pipeline is broken when command chaining DCB fetch operations are needed, and all of the registers forming the pipeline are used to handle the 3 DCB words which are fetched during such chaining operations.

Since operations such as command chaining occur relatively infrequently, it would be inefficient to provide special circuitry for attending to the chaining operation. Thus, by adaptively dedicating the DMAC and DMADB registers for serving one channel during command chaining, and plural channels in time overlap during ordinary communication data transfers, an added benefit is realized in respect to cost, size, and performance.

Another factor serving to increase the margin of safety in the operation of the IIM is that although the design goal was set to allow for 12 channels operating at 64 kbps, in realistic ISDN applications, the IIM is operated to support 4 B channels (4 receive and 4 transmit) at 64 kbps and 2 D channels (2 receive and 2 transmit at 16 kbps), or a total of 8 channels at 64 kbps and 4 channels at 16 kbps. Since the 4 channels operating at 16 kbps have longer periods of latency before they fill the synchronous pipeline, the time allowable to complete 12 transfers relative to 12 simultaneously ready channels in these application configurations (2B+D applications) is more than 600 microseconds, and therefore encompasses at least 3 worst case access periods adding up to at least 23.4 microseconds (3×7.8) of access to the Micro Channel. With such eased constraints, the IIM with the present invention can accommodate a total of at least 20 word transfers in any 600 microsecond period, which allows for enough time to service 12 ready word channels plus at least 2 command chaining processes.

Additional margin of performance is provided by a "bus hold" feature built into the MIO unit of the IIM. Micro Channel architecture rules allow for a device to retain control of the bus while a "Preempt" line is inactive and for a predetermined time (about 7.8 microseconds) after that line becomes active. The preempt line is used by processing and device entities connected to the bus to initiate arbitration; a process by which devices contending for control of the bus (i.e. driving preempt active) determine their relative priority and individually assume control of the bus. Previously (in the IDLC device), MIO and DMAC were so time "interlocked" that DMAC effectively determined the point in time at which MIO would relinquish control of the bus; whereby any transfer operation started by DMAC would be completed if bus control were not externally preempted. However, since DMAC and MIO are not tightly interlocked in the IIM, there may be short periods of time during which MIO is idle after completing a transfer, and DMAC is actively preparing for another data transfer operation.

Designing MIO to utilize the bus efficiently dictates that it be required to relinquish control of the bus as soon as possible after it goes idle. However, if MIO did this during small intervals in which DMAC is actually preparing another transfer operation, there would be a performance impact, since the operation started by DMAC could not be carried forward until MIO re-arbitrated for and obtained control of the bus (i.e. could not be continued for another 200 microseconds under worst case Micro Channel bus load conditions, which might be sufficiently long to allow for a channel overrun or underrun condition to develop in the IIM).

Accordingly, MIO is designed presently to extend its control of the bus for a selected small "Bus Hold" interval of time from the time it becomes idle (the interval presently chosen is about 0.3 microseconds, or 4 internal machine cycles of the MIO bus control state machine), if bus Preempt line has not been active for a predetermined time when MIO becomes idle, and then release the bus if it has not received further stimuli from DMAC. If DMAC initiates further action by MIO before the end of the Bus Hold interval, MIO retains control as if it had just arbitrated for and won control of the bus (i.e. retains control if needed for either 7.8 microseconds after Preempt line later goes active or until MIO goes idle for more than 0.3 microseconds whichever occurs first).

In order that this feature not adversely impact bus utilization in the system, a timer in the MIO times out from the beginning of Preempt line activation and sets limits on initiation of new bus actions after certain intervals have elapsed. In theory, the bus is available for 7.8 microseconds after preempt goes active. However, after its timer reaches a 4.0 microsecond count, MIO no longer accepts DMAC requests relating to command chaining (which require fetching of 3 instructional words), and after the timer reaches 6.0 microseconds MIO no longer accepts any further DMAC requests.

These and other objects, features, aspects and advantages of the invention will be more fully understood and appreciated by considering the following detailed description and claims.

BRIEF DESCRIPTION OF THE DRAWINGS

FIG. 3 is a chart used for explaining the conflict between bus access constraints and real time throughput requirements at the communication port interfaces of the IIM which give rise to a problem solved by the present invention.

FIG. 4 is a chart illustrating how the DMAC, DMADB, and MIO units of the IIM as presently constructed operate in time overlap relative to plural channels to effectively double the maximum word transfer throughput rate of the IIM at its system bus interface.

FIG. 7 illustrates the DMARQ unit of the IIM which interfaces between the asynchrounous DMAC unit and the synchronous section of that device.

FIG. 8 illustrates access logic of the FIFO RAM memory relative to which communication data is fetched and stored by the DMAC during its channel services, and also relative to which control information retrieved from host memory is stored by the DMAC.

FIG. 9 illustrates access logic of the DMAC RAM (DMACR) memory unit in which information is stored for controlling operations of DMAC and other units in the asynchronous section of the IIM device.

FIG. 10 is a block diagram showing registers and state machine logical subunits of the DMAC.

FIG. 11 is a block diagram of registers and state logic of the DMADB unit of the IIM.

FIG. 12 is a block diagram of registers and state logic of the MIO unit of the IIM.

FIGS. 14 and 15 respectively indicate formats of TDCR and RDCR control words stored in FIFO RAM and DMACR and used by DMAC in its operations.

FIG. 16 shows an internal functional register of the DMAC.

DETAILED DESCRIPTION

1. Device Environment

Figure 1:
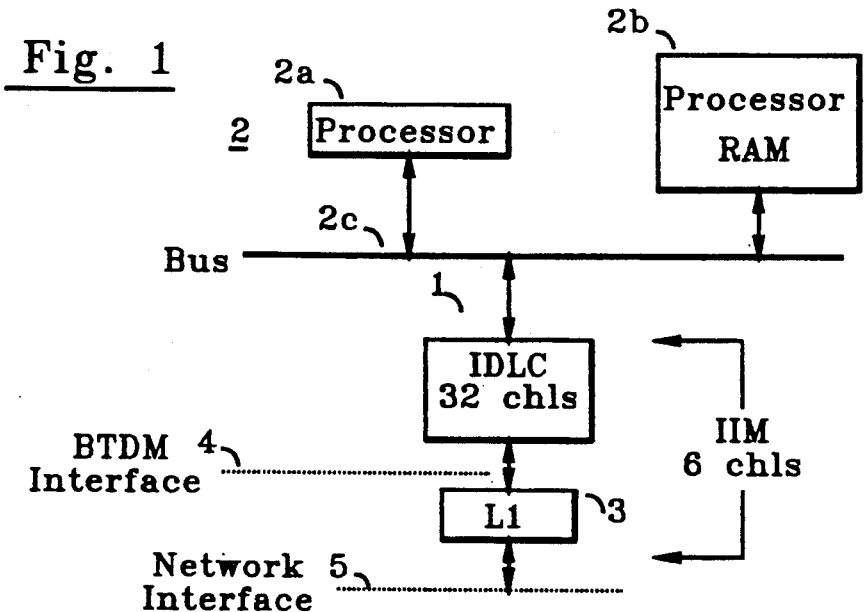
FIG. 1 illustrates the communication environment of the IDLC and IIM devices, and functional relationships between the circuits of the IIM and those of the IDLC.

Referring to FIG. 1, the IDLC (Integrated Data Link Controller) device 1 operates between a data processing system 2 and L1 (level 1) circuits 3 through a special burst time division interface (BTDM) 4. The L1 circuits link to communication ports via their external interface 5. The IIM (Integrated ISDN Module) device of present interest is a reduced size/capacity version of the IDLC. Where the IDLC is designed to support as many as 32 basic rate (64 kbps) full duplex channels, the IIM is designed to support only 6 full duplex channels, which in most ISDN applications will consist of 4 basic rate B channels and 2 lesser rate D channels (16 kbps). The IIM differs further from the IDLC in that it integrally contains the L1 circuits and BTDM interface (which are external to the IDLC).

System 2 (hereafter host system) includes a processor 2a, an associated RAM memory 2b, and an associated bus 2c. The IIM and IDLC interface to the processor 2a and RAM 2b via bus 2c. Direct memory access and bus control logic in the IIM and IDLC devices (DMAC and MIO units) enable respective devices to access RAM 2b on a direct access basis and to exercise master control over bus 2c while doing so.

Figure 2:
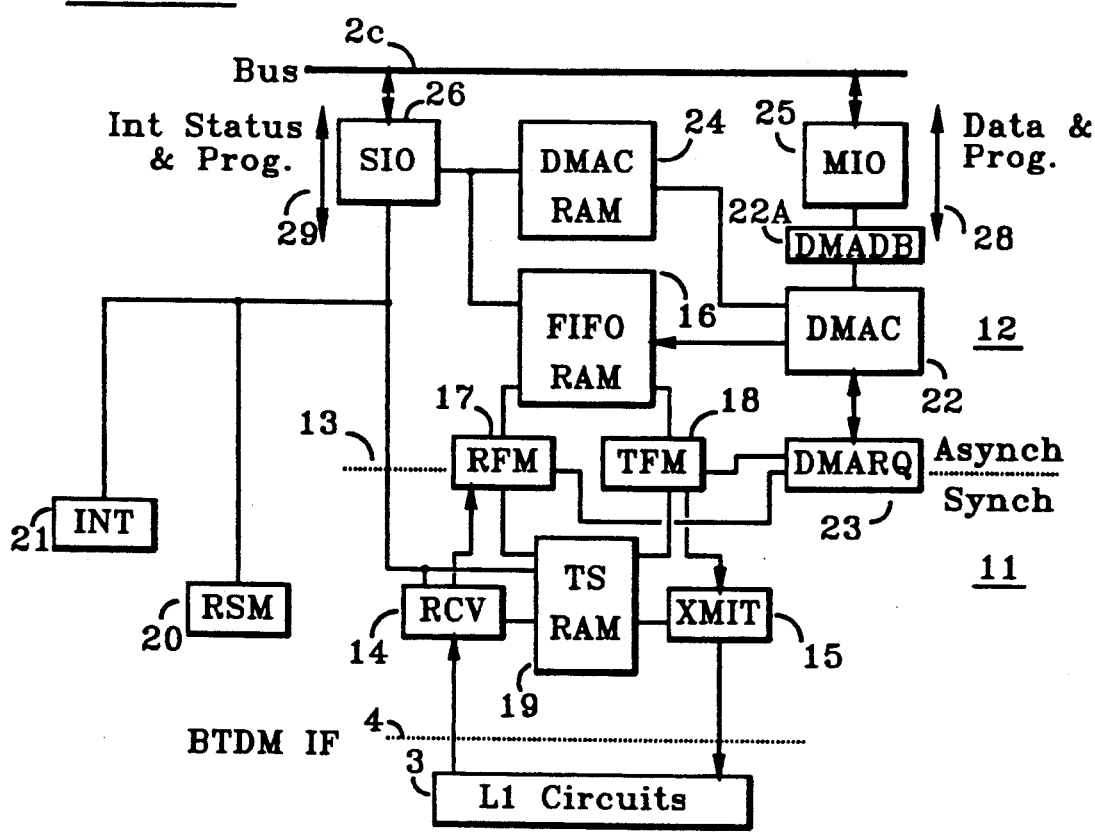
FIG. 2 is a block diagram of an IIM device constructed in accordance with the present invention.

FIG. 2 shows the parts of an IIM device. With the exception of DMAC, DMADB and MIO units to be described (which embody the present invention), all other units above the BTDM interface 4 are logically and functionally identical to correspondingly named units of the IDLC described in the above-referenced patent applications (although IIM units are designed for serving fewer channels).

As shown in FIG. 2, the IIM comprises synchronous and asynchronous sections, 11 and 12 respectively. Interface 13 between these sections extends through some of the logical units of the device as discussed below. L1 circuits 3 interface between the IIM synchronous section and up to 6 full duplex bit serial data communication links carrying data bidirectionally at ISDN basic rates of 64 kbps (as noted earlier in most ISDN applications, the IIM will most generally be used in applications involving service to 4 full duplex basic rate B channels and 2 full duplex reduced rate D channels). Thus, the L1 circuits sustain 12 internal time division multiplex channels relative to IIM external communication links; 6 receive channels for handling reception of data (receive data) and 6 transmit channels for handling transmission of data (transmit data).

Synchronous section 11 exchanges data bit serially with the L1 circuits, and sustains 12 internal time division channels (6 receive channels and 6 transmit channels) corresponding to those in the L1 circuits. Relative to data handled in each channel, logical units in the synchronous section performing serial/parallel (bit/-byte) conversion and various processing operations discussed below.

Synchronous section 11 comprises receive circuits 14 and transmit circuits 15, which interface respectively to receive and transmit channels of the L1 circuits via a BTDM (Burst Time Division Multiplex) interface 4 described in the above-referenced patent applications. Circuits 14 sustain 6 time multiplex receive data processing channels corresponding to and operating in synchronism with respective receive channels in the L1 circuits, and circuits 15 sustain 6 transmit channels corresponding to and operating in synchronism with respective transmit channels in the L1 circuits.

Receive circuits 14 receive data bit serially in each active receive channel, assembling the bits in each channel into receive bytes which are stored in FIFO RAM memory 16 by RFM (Receive FIFO Managing) unit 17. RFM manages access to FIFO RAM relative to the receive channels, and operates in synchronism with unit 14 relative to those channels.

In transmission processing operations, TFM (Transmit FIFO Managing) unit 18 manages access to FIFO RAM relative to transmit channels served by transmit unit 15, and in synchronism with time division recurrence of those channels.

Units 17 and 18, and a DMARQ (DMA Request Queue) unit discussed later, cooperate to extend the servicing of receive and transmit channels to the asynchronous section 12.

To summarize, units 14 and 17 sustain 6 receive data processing time division processing channels, corresponding to receive data bit handling channels sustained in the L1 circuits, and service the channels in time synchronism with L1 operations relative to corresponding channels. Similarly, units 15 and 18 sustain 6 transmit data processing time division channels corresponding to and synchronous with transmit data bit handling channels in the L1 circuits, and operate to service the channels in synchronism with L1 operations relative to corresponding channels. Between consecutive periods of service to any channel, logical states of units 14, 15, 17 and 18 relative to the respective channel are stored in "Time Swap RAM" (TSR) memory unit 19 (a part of synchronous section 11). Information stored in TSR relative to each served channel includes states of communication data and internal unit logic at the conclusion of the last period of service; so that service to each channel is "seamlessly" continued from one service period to the next.

Operations of TSR memory 19 and of units 14, 15, 17 and 18 relative to TSR are overseen by a Resource Managing (RSM) unit 20 in the synchronous section, and status for reportage to the host system is gathered by an Interrupt managing unit (INT) 21 in that section. Status gathered by INT is buffered in TSR.

The asynchronous section operates to transfer data between FIFO RAM 16 and host memory 2b, via system bus 2c, relative to the channels served by the synchronous section. Data is transferred over the bus in word groups of 4 bytes per channel. FIFO RAM 16 is equipped to store 4 bytes of data per channel. Transfers between memory 2b and RAM 16 are supervised by direct memory access controller (DMAC) unit 22 in response to requests presented by DMARQ (DMA Request Queue) unit 23, which the latter receives from RFM 17 and TFM 18 in the synchronous section.

RFM sets a request in DMARQ when it stores a 4th byte of receive data in FIFO RAM relative to a receive channel (i.e. a byte filling the word space in FIFO RAM allocated to the respective channel), and TFM sets a request in DMARQ when it fetches a last byte of transmit data stored in FIFO RAM relative to a transmit channel.

Instructions required by DMAC 22 for conducting data transfers between FIFO RAM and host memory 2b are held in DMA Controller RAM (DMACR) memory unit 24. Control information required by RFM and TFM to manage their accesses to FIFO RAM relative to channels (location of next data byte to be stored or fetched, etc.) is stored in FIFO RAM by operations of DMAC 22. Functions associated with arbitrating for access to and controlling bus 2c, in respect to data transfers, are performed by Master I/O bus control unit (MIO) 25 in response to control information passed to it by DMAC 22.

In the IIM, an additional DMA data buffer (DMADB) unit 22A associated particularly with the present invention (no counterpart in the IDLC), interfaces between DMAC 22 and MIO 25, for purposes to be described.

In both the IIM and the IDLC, a slave I/O unit (SIO) 26 in the asynchronous section operates as a slave of the external host processor 2b, to transfer initial state defining functions from host processor 2a to RSM and TSR and to transfer interrupt status information from INT and TSR to host processor 2b. The initial state defining functions passed from processor 2b to RSM and TSR serve effectively to activate process channels in the synchronous section and program operations relative to such channels (i.e. distinguish channels carrying digitized sound and video from channels carrying data arranged in a special protocol format such as HDLC).

Interruption status information passed to the processor 2b enables the latter to determine when operations in any channel reach a normal or abnormal conclusion and to take appropriate action. The SIO and its paths and operations form no part of the present invention.

Arrows 28 and 29 in FIG. 2 indicate the types of information flowing respectively through DMAC and SIO. Arrow 28 indicates that communication data and instructional information for directing operations of DMAC and units 17 and 18 is handled through DMAC (and DMADB and MIO), and arrow 29 indicates that interrupt status and initial device and channel state (program) information are conducted through SIO.

Figure 5:
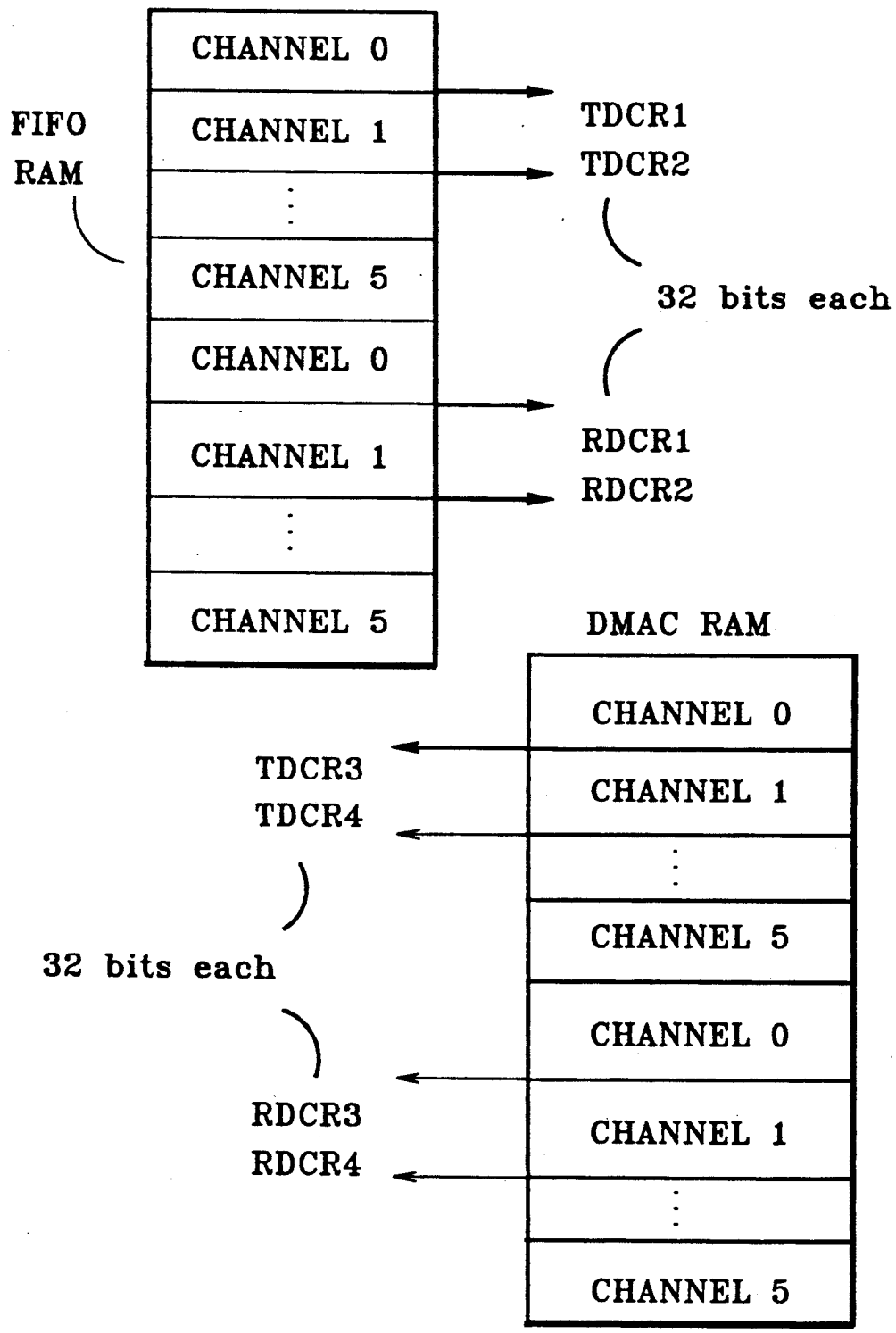
FIG. 5 illustrates the word capacities and word forms stored in FIFO RAM and DMAC RAM memory devices which are integrated within the IIM and are used by the DMAC unit of the IIM for holding data and control information relative to bus transfer operations.

As shown in FIG. 5, FIFO RAM contains two word spaces dedicated to each of six receive channels, and two word spaces relative to each of six transmit channels. The receive and transmit channels are paired into six associated duplex channels numbered 0–5. Each word space holds up to 32 information bits and an undesignated number of parity check bits (typically, 4 of the latter bits, or 1 check bit per byte).

Spaces allocated to receive channels are designated RDCR1 and RDCR2 (RDCR stands for receive data control register), and those reserved for transmit channels are designated TDCR1 and TDCR2 (TDCR stands for transmit data control register). RDCR2 and TDCR2 are respectively used to store (4 bytes of) receive data and (4 bytes of) transmit data relative to respective channels. RDCR1 holds current address information relative to a circular buffer space in host memory, representing the next address in that space at which receive data is to be stored. TDCR1 holds information indicating how many bytes of transmit data are currently stored in FIFO RAM and information indicating when an end of frame or end of chain condition occurs in a respective transmit channel process.

DMAC RAM also contains 24 word spaces dedicated to 12 channels; 2 to each receive channel and 2 to each transmit channel. These spaces are used as control registers for storing instructional information defining operations of DMAC (and indirectly those of DMADB and MIO) relative to respective channels. Such instructional information includes certain address indicators relative to host memory which will be explained later. Receive data control registers associated with each receive channel are designated RDCR3 and RDCR4. Transmit data control registers associated with each transmit channel are termed TDCR3 and TDCR4. When a previous inactive channel is activated, the respective control data register spaces in DMAC are initially loaded by the host processor 2a via SIO unit 26. In command chaining operations associated with transmit channel processing, instructional information for continuing operations in active transmit channels (after exhaustion of existing instructional information) are fetched from host memory 2b under direction of DMAC and stored into respective control data registers TDCR1, TDCR3 and TDCR4 in FIFO RAM and DMAC RAM.

Figure 6:
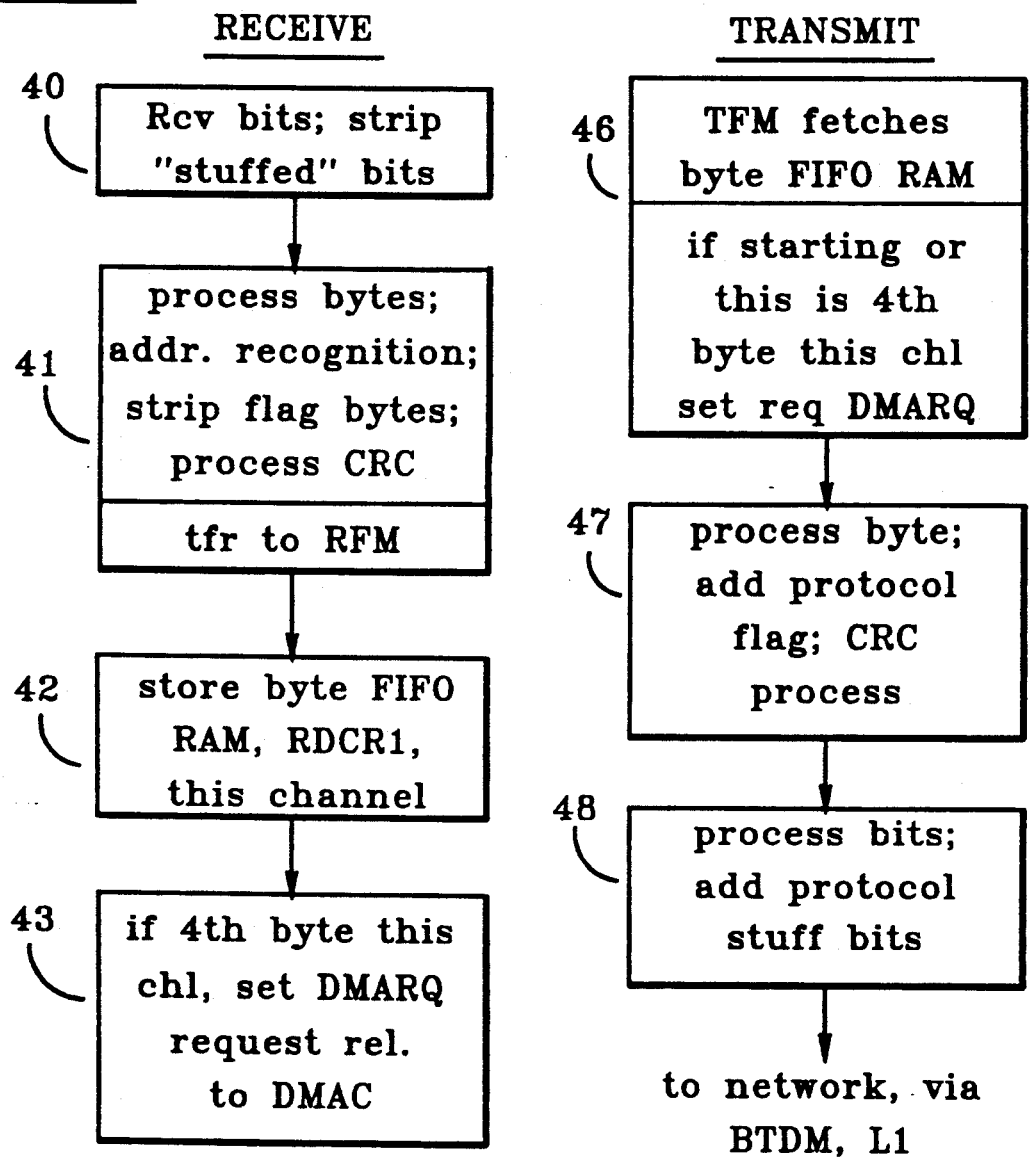
FIG. 6 illustrates the per channel operations performed within the synchronous and asynchronous sections of the IIM relative to receive and transmit subchannels of any communication channel.

IIM operations performed in synchronous section 11, relative to receive data and transmit data, are indicated in FIG. 6. Each channel is programmable to handle data in either a "clear" format or in a standard protocol format such as HDLC. Data in clear format (typically digitized sound and facsimile) etc.) is passed in the "clear"; i.e. unmodified and without redundancy checking. Data in protocol format is modified and checked.

Relative to receive data in protocol format, receive units 14 (although shown as a single unit, receive circuits 14 actually comprise 2 separate units, one for bit handling and another for byte processing) detect and discard redundant (stuffed) bits and special flag characters, and set interrupt status conditions for notifying the host processor of flag receptions and detected error conditions (operations 40, 41, FIG. 6). The receive units also perform cyclic redundancy check (CRC) verification and address recognition functions. Address recognition is used to detect data not intended for processing or storage by the respective host system, such data being discarded by the IIM (thereby reducing processing burdens on the host bus and system).

Foregoing operations are performed by receive circuits 14 during the handling of bits and bytes in each channel. Receive data bytes not discarded are passed to RFM and stored by that unit in FIFO RAN (operations 42); in a selected one of the 4 byte positions of the respective channel's RDCR2 register. RFM detects when any RDCR2 space becomes filled with 4 receive data bytes, and at such times sets a request relative to the respective receive channel in DMARQ unit 23 (operations 43).

Request positions in DMARQ are scanned repeatedly by DMAC. When an active request is found, DMAC initiates asynchronous coordinated action—by DMAC, DMADB, and MIO—to transfer a receive data word from the associated channel's RDCR2 space in FIFO RAM to a selected word space in host memory 2b (which typically would be a part of a pre-allocated block of word spaces in that memory; configured and accessed as a "circular buffer"). The coordinated aspect of this type of transfer is an important part of the present invention. When the transfer is completed, or aborted due to an error condition, the associated request in DMARQ is reset (by DMADB if the transfer is completed, or by DMAC if the transfer is aborted due to error).

Inverse functions are performed by transmit units 15 relative to protocol formatted data in any transmit channel (like circuits 14, transmit circuits 15 actually comprise 2 units, one for byte processing and another for bit processing). Transmit data not having a protocol format is passed in the clear. When units 15 are servicing an active transmit channel and are ready for processing more data, TFM is prompted to fetch one or more bytes of data from the TDCR2 space in FIFO RAM allocated to the respective channel (operations 46). TFM transfers the fetched data directly to transmit units 15. While accessing FIFO RAM, TFM detects if the respective channel's TDCR2 register is emptied by the latest fetch. When that occurs TFM sets a request relative to the respective transmit channel in DMARQ (operations 46). As in the handling of requests associated with receive channels, DMARQ is scanned by DMAC and when the latter finds an active request it initiates asynchronous coordinated action (by DMAC, DMADB and MIO) to fetch a word of transmit data from host memory 2b to the respective channel's TDCR2 space in FIFO RAM.

Transmit units 15 process transmit bytes in protocol formatted channels, inserting flag characters and cyclic redundancy check characters where appropriate (operations 47), and then additionally process individual bits, adding stuff bits when appropriate (operations 48); i.e. when needed to prevent non-flag data bit sequences from appearing as flag symbols.

Of interest relative to the description of problem which follows next, registers in units 14 and 17 form a buffering pipeline which at any instant of time can hold up to 4 bytes of receive data relative to any receive channel, and registers in units 18 and 15 form a similar 4 byte capacity pipeline relative to transmit data in any transmit channel. Normally, as soon as the last bit of a non-flag receive data byte is received relative to any receive channel, the byte is transferred immediately to FIFO RAM provided that the RDCR2 space of that channel is not then filled. If the space is filled, RFM has the "latency" time associated with reception of 4 successive bytes in the respective channel to empty that space before an overrun error is charged to the channel (the 4 byte time takes into account 3 bytes of pipeline buffering in units 14 and 17 and the capacity of the bit handling part of units 14 to accommodate assembly of bits of another or 4th byte).

Similar considerations lead to the observation that from the time a TDCR2 register of a transmit channel first becomes empty TFM has a latency or leeway time corresponding to the time required to transmit 4 additional bytes relative to that channel before an underrun error condition occurs in that channel.

2. Description of Problem

Bus constraint issues addressed presently, and the present solution, are illustrated in chart form in FIGS. 3 and 4, respectively. FIG. 3 shows that in the prior art (IDLC) device, operations involved in preparing for a data transfer relative to individual channels such as C1 and C2 (between FIFO RAM and host memory 2b), and for carrying out the transfer, are performed separately; preparation functions by DMAC acting alone, and transfer related functions by DMAC and MIO acting in coordination. Preparation operations by DMAC (fetching of instructional information from DMAC RAM, transfer of control information to MIO, and fetching of receive data from FIFO RAM if a receive channel is being served) take (about) 1.2 microseconds (first line in FIG. 3). Bus data transfers by DMAC and MIO in interlocked coordination (transfer of 4 data bytes across the system bus by MIO, transfer of transmit data by DMAC from MIO to FIFO RAM if the operation is relative to a transmit channel, resetting of the associated DMARQ request by DMAC at completion of the transfer, or processing of error condition and resetting of DMARQ request by DMAC if the operation is aborted due to error) take (about) 1.0 microseconds (second line in FIG. 3). Thus, a complete preparation and data transfer relative to one channel takes (about) 2.2 microseconds per data word transfer.

Viewing this in relation to "worst case" IBM Micro Channel bus constraints (maximum number of adapters attached to the channel and all operating at maximum rates relative to the bus so that the bus always has "preempt" requests for bus access pending and "fairness" limits any one bus adapter to one access per 200 microseconds; likelihood of which is rather small), DMAC and MIO have expectation of minimal access to the bus for 15.6 microseconds (2×7.8) in any 400 microsecond period. If 12 channels were ready for bus transfers simultaneously, at the beginning of that period, the prior art DMAC and MIO in theory could carry out only 8 of the 12 word transfers required in that period; i.e. 4 transfers in each 7.8 microseconds access, by preparing a first transfer while arbitrating for bus access, carrying out the first transfer in the first microsecond of access, and carrying out 3 more instruction preparations and transfers in the next 6.6 microseconds). Thus, under these worst case conditions one or more receive channel overrun and/or transmit channel underrun errors would accrue using the prior art units.

Although the probability of all 12 channels being ready at the same time is small, and the expected frequency of such occurrences is rather low, this minimal design target is considered reasonable considering the added possibility of requiring command chaining action in the same 400 microsecond period, and evaluating the added expected load on the system for dealing with channel overrun and underrun errors and retransmission processes if a lesser design target had been chosen. Hence, redesign to at least the foregoing target capability was deemed desirable.

FIG. 4 simplistically indicates the approach taken presently, for redesigning the IIM asynchronous logic to be able to handle 12 or more channel word transfers within the time of two Micro Channel bus accesses. Receive data transfers and transmit data transfers (between FIFO RAM and host memory) require different handling. The technique used for a series of receive data transfers is suggested in the first two lines of FIG. 4, and the technique used for a series of transmit data transfers is shown in the last two lines of that Figure. The handling of a mixture of alternating receive and transmit transfers, and the timing thereof, will be readily understood from an explanation of this figure.

In receive data transfers, relative to successive receive channels (RCV CHLs) C1 to C6, DMAC operates as before to prepare the instructions and receive data for each transfer and while it is so engaged relative to one channel (C2, C3, . . . ), the newly added DMADB unit acting in concert with the functionally unmodified MIO unit completes a data transfer relative to a previously prepared channel (C1, C2, . . . ) in 1.0 microseconds. Interestingly enough, without time constraints of having to wait for the DMADB/MIO operation, DMAC can prepare/fetch the instructions and receive data needed for each transfer in the same 1.0 microseconds interval (0.6 microseconds to fetch instructions and 0.4 microseconds to fetch the receive data word to be transferred) as indicated in FIG. 4.

Thus, for instance, in preparing for a receive transfer relative to channel C2, DMAC retrieves control information (from DMAC RAM) needed for the transfer (including the number of receive data bytes to be transferred and the destination address in host memory in which the data is to be stored) and the receive data word (from FIFO RAM RDCR2/C2) which is to be transferred. While this is occurring, it is assumed that MIO has obtained access to the system bus and that it and DMADB are conducting a transfer relative to previously prepared receive channel C1 which will be completed by the time that the preparation relative to C2 is finished. Thus, as soon as DMAC completes preparation relative to C2, it and DMADB instantaneously "swap" information; DMADB receiving the control information and receive data just prepared relative to C2 and DMAC receiving status information indicating the state of the transfer relative to C1. Then, while DMADB and MIO are handling the receive transfer relative to C2, DMAC prepares for the transfer relative to C3. Although not indicated in the charts of FIG. 4, DMAC would also be resetting the DMARQ request relative to C1 while preparing for C3 (and attending to any error indication received in the status swap relative to C1).

In transmit data transfers, DMAC prepares control information relative to one channel while DMADB and MIO carry out a fetch of transmit data relative to a previously prepared channel, and in the following interval of operation DMAC completes the transfer of the transmit data to FIFO RAM while preparing for another bus transfer. Thus, for example, during one interval of operation, indicated at 50, DMAC prepares for a transmit data transfer relative to C3 and stores transmit data in FIFO RAM relative to C1—data fetched from host memory by DMADB and MIO during a previous interval 51—and DMADB and MIO act in concert to carry out a transfer relative to C2 which had been prepared by DMAC during interval 51. When these operations have finished, at time instant 52, DMAC and DMADB swap information; but this time more information than they swap relative to a receive data transfer. In the "transmit" swap at instant 52, DMAC passes control information relative to C3 to DMADB and receives from DMADB control information previously passed relative to C2, the status of the transmit data transfer relative to C2 (complete or aborted due to error), and the transmit data fetched relative to C2 (if the fetch was successful). Thus, in the next interval 53, DMAC using the control information received relative to C2 completes the transfer of transmit data relative to FIFO RAM TDCR2/C2 and resets the DMARQ request relative to C2 while carrying out preparational activities relative to C4 and while DMADB/MIO are carrying out the bus transfer activities relative to transmit data of C3.

3. Signal Notation

In the following sections, descriptions are given of units in the asynchronous section; including DMARQ, FIFO RAM, DMAC RAM, DMAC, DMADB, and MIO. Signals transferred between these units are indicated in the drawings using a notation "A_B_C", where C usually identifies the signal or function and A and B usually identify origin and destination units between which the signal is passed. In certain instances, origin or destination unit identity may be omitted (where considered apparent from the drawing context and unlikely to cause confusion relative to notations in other drawings). Notations not readily falling into any of these categories are separately explained in first references to respective signals.

4. DMARQ Description

DMARQ (Direct Memory Access Request Queue) unit constitutes the main interface between the synchronous and asynchronous sections of the IIM for transferral of receive and transmit data. Referring to FIG. 7, DMARQ contains separate sections 60 and 61 for respectively handling data transfer requests relative to receive and transmit channels. Requests are entered into section 60 by RFM and into section 61 by TFM.

Receive queue 60 comprises a set of request queue latches 62, one for each receive channel (i.e. 6 in the IIM configuration), input selection logic 63 for steering set and reset signals to latches 62, output multiplexing (mux) circuit 64 for synchronously presenting states of individual (receive channel) requests to RFM, and output mux 65 for asynchronously presenting individual request states to DMAC.

Transmit queue section 61 comprises request latches 66, one per transmit channel, input selection logic 67 for steering set and reset signals to individual latches, output mux 68 for synchronously indicating states of individual (transmit channel) requests to TFM and output mux 69 for asynchronously indicating states of individual requests to DMAC.

During intervals of synchronous service to each channel, resource manager RSM (unit 20, FIG. 2) produces time slot indication signals RSM_TSI designating the channel currently being served. These signals are applied to all units in the synchronous section of the IIM and to the input selectors and output mux circuits of DMARQ. In DMARQ, RSM_TSI effectively designates the latch to which input set signals activated by RFM and TFM should be applied, and the request states to be synchronously presented to RFM and TFM, via mux circuits 64 and 68 respectively.

Signals RFM_SET, for setting receive request latches 62, are activated by RFM when RFM detects that a byte transferred by it to a receive data register in FIFO RAM (RDCR2) has filled that register. RFM_SET is steered by selection circuit 63 to the latch 62 assigned to the (receive) channel then designated by RSM_TSI (i.e. the channel then being served by RFM). RSM_TSI also conditions mux 64 to sequentially scan (set/reset) states of latches 62, in synchronism with service to corresponding receive channels, and present corresponding signal indications to RFM; whereby RFM can track the status of receive channel data transfer requests it has activated.

Receive channel requests in latches 62 are also polled asynchronously by DMAC, in channel number sequence, via receive channel count signals, DMAC_RV_CNT, applied to mux 65. When an active (set) request is found, DMAC initiates service relative to the respective receive channel for asynchronously transferring receive data from that channel's RDCR2 register in FIFO RAM to host memory. The data transfer relative to host memory is conducted by DMADB and MIO as described later.

When an operation associated with a receive channel request has been performed correctly, DMADB coincidently activates DMADB_RCV_RESET and DMADB_CH_NBR relative to select circuit 63. DMADB_CH_NBR indicates the number of the receive channel just served by DMADB, and with DMADB_RCV_RESET, causes circuit 63 to steer a reset input to the request latch position assigned to the respective receive channel. If an operation relative to a receive channel request is aborted due to error, circuits 63 will be activated to reset a respective request either by DMAC_RCV_RESET and DMAC_CH_NBR, or by DMADB_RCV_RESET and DMADB_CH_NBR, depending upon where the error occurred in the receive data transfer path from FIFO RAM to host memory. If the error was in readout of information from FIFO RAM the reset is controlled by DMAC, whereas if the error occurred relative to the system bus or host memory, the reset is controlled by DMADB.

After a receive channel request has been reset, the next time status of the respective request is presented to RFM via mux 64, RFM will reset its internal status indication relative to the respective receive channel and allow more receive data to be stored into the FIFO RAM RDCR2 space of the respective receive channel (if the instructional information stored in RDCR1 relative to that channel indicates that the channel is still active).

If a synchronous transfer of transmit data from FIFO RAM by TFM empties the data register (TDCR2) assigned to the associated transmit channel, TFM activates TFM_SET relative to selection circuit 67. The coinciding channel designation by RSM_TSI conditions circuit 67 to apply a set input to the latch 66 assigned to the associated transmit channel. RSM_TSI also conditions mux 68, whose output extends to TFM, to sequentially scan the states of request latches 66, in synchronism with service to associated channels, and cyclically present indications of respective states to TFM. Thus, TFM can track states of transmit channel requests it has activated.

Transmit channel requests in latches 66 also are scanned asynchronously, in channel number sequence, by means of transmit channel count function DMAC_TX_CNT applied from DMAC to mux 69. When an active (set) request is found, service relative to the respective channel is initiated for transferring transmit data to that channel's TDCR2 register in FIFO RAM from host memory.

When an operation associated with a transmit channel request has been performed correctly or aborted due to error, DMAC activates DMAC_XMIT_RESET and DMAC_CH_NBR, relative to select circuit 66, causing circuits 66 to steer a reset input to the request latch position assigned to the respective transmit channel (DMADB is not involved in transmit request resetting because final handling of transmit data (into FIFO RAM) or of abort status relative to such is the responsibility of DMAC.

After transmit data has been successfully transferred to FIFO RAM, and the associated transmit channel request has been reset, the next time status of the respective request is presented to TFM via mux 68, TFM will reset its internal request status indication and allow for fetching more transmit data from FIFO RAM relative to the respective transmit channel.

5. FIFO RAM and DMAC RAM Access

Signal paths used by RFM, TFM and DMAC for accessing FIFO RAM are shown in FIG. 8. RAM storage array 80 receives addressing and data inputs via select circuits 81, and presents (instruction and transmit data) outputs to RFM, TFM, DMAC and SIO (inputs from and outputs to SIO are omitted from the drawing as not relevant to the present invention) via FIFO_DATA bus 82. Array outputs are also checked by parity check circuit 83, which activates FIFO_ERROR relative to the units connected to bus 82 if parity error is detected.

State machine logic 84 controls operations of array 80 and presentation of address and data signals to the array via select circuits 81. Requests from RFM, TRM and DMAC for read and write access to array 80 are latched by latches 85, are scanned sequentially by state machine logic 84 and serviced in sequence. As a request is selected for service, circuit 81 is controlled to apply address information associated with the request source to array 80. If the request is for a write (store) access, logic 84 controls circuit 81 to apply data from the request source to the data input of the array, along with an address determined in part by the request type and in part by channel designation information presented relative to an associated channel being served by the source.

In association with requests from RFM and TFM, channel slot indicator RSM_TSI is translated by circuits 81 into a partial address relative to the 4 word spaces assigned to the respective channel. Selection of one of the 4 spaces is determined as a function of the request source. If the source is RFM, spaces RDCR1 and RDCR2 assigned to the respective channel are sub-addressed. If the source is TFM, respective spaces TDCR1 and TDCR2 are sub-addressed. Further selection of a single word space, and where appropriate a single byte location in a word space are determined by the type of request.

If a request from RFM is for a read/fetch operation, request RFM_RD is active. Since RFM reads only instructional information, the address of the associated channel's RDCR1 space is selected. If a request from RFM is for write/store access, RFM_DATA represents receive data to be written and RFM_WR is active. In this case, byte position pointer RFM_BPP is examined and a byte of receive data at RFM_DATA is written to a byte location in the associated channel's RDCR2 or RDCR1 as a function of the pointer information.

If a request from TFM is for a read, TFM_RD1 or TFM_RD2 will be active. If TFM_RD1 is active, the TDCR1 space of the channel designated by RSM_TSI is addressed. If TFM_RD2 is active, contents of the associated channel's TDCR1 and TDCR2 spaces are addressed and fetched to FIFO_DATA bus (in 2 successive memory access cycles). TFM receives each fetched word from the bus and sub-selects bytes if appropriate. Write requests from TFM are indicated via TFM_WR1, and result in writing of instruction information (TDFSW) presented at TFM_DATA/TDFSW into the respective channel's TDCR1 space.

Requests from DMAC are indicated by DMAC_FIFO_REQ and interpreted as requests addressed to the (TDCR1 space of the) channel designated by the current state of DMAC_CH_NBR. The operation associated with each request (read or write, 1 word or 2 words) is defined by DMAC_B_OPCODE. Data words to be written are presented at DMAC_DATA. Upon completion of requested operations, acknowledgements are returned to respective requesting units from state machine 84.

DMAC RAM (DMACR) has a similar access configuration, shown in FIG. 9, except that it is accessible only to DMAC (and SIO). Paths from and and to SIO have no relevance to the present invention, and therefore are not shown in FIG. 9. DMACR storage array 90 is identical in capacity to FIFO RAM array 80. Inputs are applied to the array via selection circuits 91. Outputs, DMACR_DATA, are transferred via bus 92 to DMAC. Operating functions (read/write), and addresses, are selected under direction of state machine logic 94 in association with requests from DMAC indicated by latches 95. Latches 95 are set by DMAC_DMACR_REQ and DMAC_C_OPCODE; the latter indicating the request fuction (read or write, 1 word or 2 words). Read outputs from the DMACR array are parity checked by the state machine logic, rather than a separate parity check circuit such as 83, since asynchronous operations of DMAC are not as tightly time constrained as those of the synchronous units (RFM, TFM). Parity error indications are produced by the state logic when appropriate.

6. DMAC Block Diagram

As shown in FIG. 10, DMAC contains 5 registers, shown generally at 100, a "2 out of 3" compare circuit 101, mux/selector circuit 102, and 5 tightly coupled state machines shown generally at 103.

Individual registers 100 and state machines 103 are referred to hereafter by names shown in the drawing: RFA_NDA register, RBCA register, RLA_TBC register, DATA HOLD register, CURRENT ADDR register, DMA_A state machine, DMA_B state machine, DMA_C state machine, RCV_ARB state machine, and XMIT_ARB state machine. DMAC receives data inputs via buses designated FIFO_DATA, DMAC-R_DATA, and DMADB_DATA, respectively connecting with outputs of FIFO RAM (FIG. 8), DMACR (FIG. 9), and DMADB (FIG. 11).

Functions of individual registers and state machines will be described later. In general, it should be noted that DMAC processes requests in DMARQ, and initiates data transfers relative to associated receive and transmit channels. During preparation for such transfers, DMAC fetches instructional information of the associated channel from FIFO RAM and DMACR. If a receive channel is being served DMAC fetches receive data of the associated channel from FIFO RAM. If a transmit channel is being served, and the instructional information indicates requirement for DCB chaining, DMAC initiates retrieval of 3 DCB words from host memory before servicing the data transfer request. The DCB's are stored in FIFO RAM and DMACR.

The 5 state machines 103 are tightly coupled. DMA_A coordinates operations of the other 4 state machines, and prioritizes handling of requests relative to DMADB. DMA_B and DMA_C respectively interface to FIFO RAM and DMACR. XMIT_ARB and RCV_ARB state machines operate respectively to poll the transmit request and receive request queues in DMARQ. Request bits in each queue are polled in channel number sequence, subject to mask conditions defined below. When an active and unmasked request is found, polling is halted until DMA_A state machine accepts the request and acknowledges to the respective ARB state machine. When DMA_A accepts a request it receives the respective receive channel or transmit channel count from the respective ARB state machine, and sets a mask bit relative to the respective channel so that the same request bit is not selected again by that ARB state machine. If transmit and receive requests are active simultaneously, DMA_A gives higher priority to the receive request.

Additional details of DMAC state machines and register usage are given hereafter.

7. DMADB Block Diagram

DMADB (FIG. 11) comprises address register DMADB_ADDR_REG 130, data register DMADB_DATA_REG 131, state machine 132, and several control function registers indicated at 135. The registers at 135 comprise a request bit register REQ and a completion indicating bit register DONE. Outputs of these registers, DMADB_REQ and DMADB_DONE1 extend to DMAC. State machine 132 produces a second completion indication DMADB_DONE2 which also extends to DMAC.

DMADB performs operations defined by opcode signals from DMAC, DMAC_DMADB_OPCODE. The opcode is applied to state machine logic 132 and translated by the latter into read and write signals to MIO: DMAC_MIO_RD1, DMAC_MIO_RD3, and DMAC_MIO_WR1. RD1 is used to instigate a transmit data fetch by MIO relative to host memory. RD3 is used to instigate a chained DCB (3 word) fetch, and WR1 is used to instigate a receive data storage operation relative to host memory.

The request bit in REQ is set to 1 by DMAC via DMAC_DMADB_REQ, when an operation by DMADB is requested by DMAC, and reset to 0 by state machine 132 when the requested operation is finished. DMADB_DONE1 indication is set when DMADB has finished fetching transmit data from host memory, and is reset by DMAC_DMADB_DRST when DMAC has taken note of the DONE1 indication. State machine indication DMADB_DONE2 is activated by state machine 132 when DMADB has completed any fetch operation requested by DMAC.

Address register 130 receives address values from DMAC via address buses DMADB_ADDR1 and DMADB_ADDR2, and transfers respective addresses to MIO via DMAC_MIO_ADDR for use relative to the system bus and host memory. DMADB_ADDR1 connects to output of DMAC register RFA_NDA (FIG. 10). DMADB_ADDR2 connects to output of DMAC current address register CURRENT ADDR REG (FIG. 10). DMADB_ADDR1 is applied as address to be used relative to MIO transfers of transmit data and receive data. DMADB_ADDR2 is applied during DCB fetching operations to be described later.

Data register 131 receives inputs MIO_DATA from MIO (transmit data and chained DCB information fetched from host memory) and DMAC_DMADB_DATA from DMAC (receive data to be stored in host memory). Outputs of register 131 are transferred to MIO via DMAC_MIO_DATA and to DMAC via bus DMADB_DATA.

It may be noted above that signals transferred between MIO and DMADB do not indicate DMADB as source or destination. This is because the logical design of MIO in relation to DMAC has not been modified, and DMADB is in effect treated as logically transparent to MIO. Thus, addresses presented by DMADB register 130, via DMAC_MIO_ADDR, appear to MIO to have come directly from DMAC, data transferred from DMADB register 131 via DMAC_MIO_DATA appears to MIO to come directly from DMAC, and data presented by MIO to DMAC via MIO_DATA is actually passed to and through DMADB.

DMAC signals intent to apply address information to register 130 via DMAC_A_SWAP input to state machine 132, and intent to apply and/or receive data relative to register 131 via DMAC_D_SWAP.

MIO signals its receipt of the first, second and third words of a DCB chaining transfer via respective signals MIO_DMAC_ACK0, MIO_DMAC_ACK1 and MIO_DMAC_ACK2, and state machine 132 passes respective acknowledgement indications to DMAC via signals DMADB_ACK0, DMADB_ACK1, and DMADB_ACK2. MIO signals completion of a transmit data fetch or a DCB fetch via MIO_DMAC_DONE, and state machine 132 presents a corresponding completion indication to DMAC via DMADB_DONE2.

DMADB resets requests in the receive queue of DMARQ after receive data has been written into host memory via MIO. DMADB also resets mask bits in the DMAC via DMADB_MASK_RST. DMAC mask bits are used internally by and between DMAC state machines to enable DMAC to serve two channels at one time and to mask out the request of either channel so that duplication of service functions is avoided.

Additional information on this unit is given below in discussions of interactive operations of DMAC, DMADB and MIO, and in descriptions of DMAC state logic.

8. MIO Block Diagram

MIO (FIG. 13) comprises a data register 140, data bus receiver circuits 141, data bus driver circuits 142, address bus driver circuits 143, mux/selector circuit 144, 2 or more bus control state machines 145 and 146, and internal timer circuit 147. State machine 145 interfaces to and controls the Micro Channel bus. The other state machine 146 interfaces and controls another bus (or buses). The other bus or buses has/have no relevance to the present invention; hence, their control lines are not shown.

Data receiver and driver circuits, 141 and 142 respectively, interface to data lines in all buses to which the IIM connects, but again only the attachment to Micro Channel bus is considered relevant presently. Likewise, address driver 143 interface to all buses with only the attachment to Micro Channel of present interest. Specific outputs, inputs and operations of state machine 145 relative to the Micro Channel bus are discussed below. These operations include Bus Hold operations, of particular interest presently, involving interaction between state machine 145 and timer 147.

During fetches of transmit data and chained DCB information from host memory, receiver circuits 141 receive data signals from data lines HOST_DATABUS on the Micro Channel bus. The data is received in half-word units (16 bits plus 2 parity bits). The half-words are parity checked in parity check circuits 148. The first half-word is stored in data register 140 and applied at the output of that register to one half of the lines on full-word wide (32 bit) bus MIO_DATA 149. The second half-word is passed directly to the other half of the lines on bus 149.

During transfers of receive data to host memory, driver circuits mux circuits 144 apply alternate halves of a data word received at DMAC_MIO_DATA to driver circuits 142 which drive corresponding half-word signals out on HOST_DATABUS.

During foregoing data transfers, addresses received from DMAC/DMADB, via DMAC_MIO_ADDR, are applied via drivers 143 to bus address lines BUS_ADDR. Address signals at BUS_ADDR define locations in host memory to be read out or into which data at HOST_DATABUS is to be written.

Transfer operations to be conducted relative to host memory are defined by signals at DMAC_MIO_RD1, DMAC_MIO_RD3 or DMAC_MIO_WR1. RD1 and WR1 are used respectively for fetching of transmit data from host memory and storage of receive data in host memory. Acknowledgements of discrete word transfers are indicated to DMAC/DMADB via MIO_DMAC_ACKn (n=0, 1, and 2), and completion indications relative to requested operations are indicated via MIO_DMAC_DONE. If parity error is detected by check circuits 148, associated error indication is given to DMAC via MIO_DMAC_PE.

Control signals exchanged between the state machine and specific lines on the Micro Channel bus are shown at the right side of the state machine. Signals at MIO_S0/S1 indicate data read or data write. Signals driven out to PREEMPT line represent requests to arbitrate for access to the bus. Signals received from PREEMPT line indicate requests to arbitrate from other devices on the bus. Bus line BURST is activated only when IIM controls the bus, and when activated by IIM this line indicates that multiple access cycles are to be taken. CMD is activated to indicate a Micro Channel command function.

ARB is a bus on which arbitrating devices indicate their arbitration levels (priorities) and permits each device to determine whether it has highest priority for access to the bus (during arbitration the device having highest priority continues to signal on ARB while the other devices progressively remove their signals, and eventually the highest priority device determines it is the only survivor which implies that that device now controls the bus). ARB_GNT is an arbitration grant signal from a control circuit on the bus indicating that an arbitration cycle should begin.

ADL is an address decode latching signal sent from the IIM when it wins control of the bus. DPAREN is a data parity enabling indication given by the device in control of the bus. CHRDY_RTN is an external acknowledgement indicating that the transfer cycle is ending. DS16_RTN is a returned indication indicating that the data size which can be received is 16 bits. CHCK is an external channel check indication that error has occurred on the bus. SFDBK_RTN is an external returned indication of selected feedback, indicating that the slave (host memory) device has decoded the address correctly.

In Micro Channel mode, MIO state machine arbitrates for and directs utilization of the bus in accordance with Micro Channel conventions as a level B bus master.

9. Operations of DMAC and DMADB

The next three sections describe interconnections and operations of DMAC and DMADB on a finer level than in the earlier discussion of FIG. 4. Thereafter, the Bus Hold feature of the MIO will be described, and details of the state machines of DMAC and DMADB will be given.

9.1 Pipeline Buffer Registers in DMAC, DMADB

Figure 13:
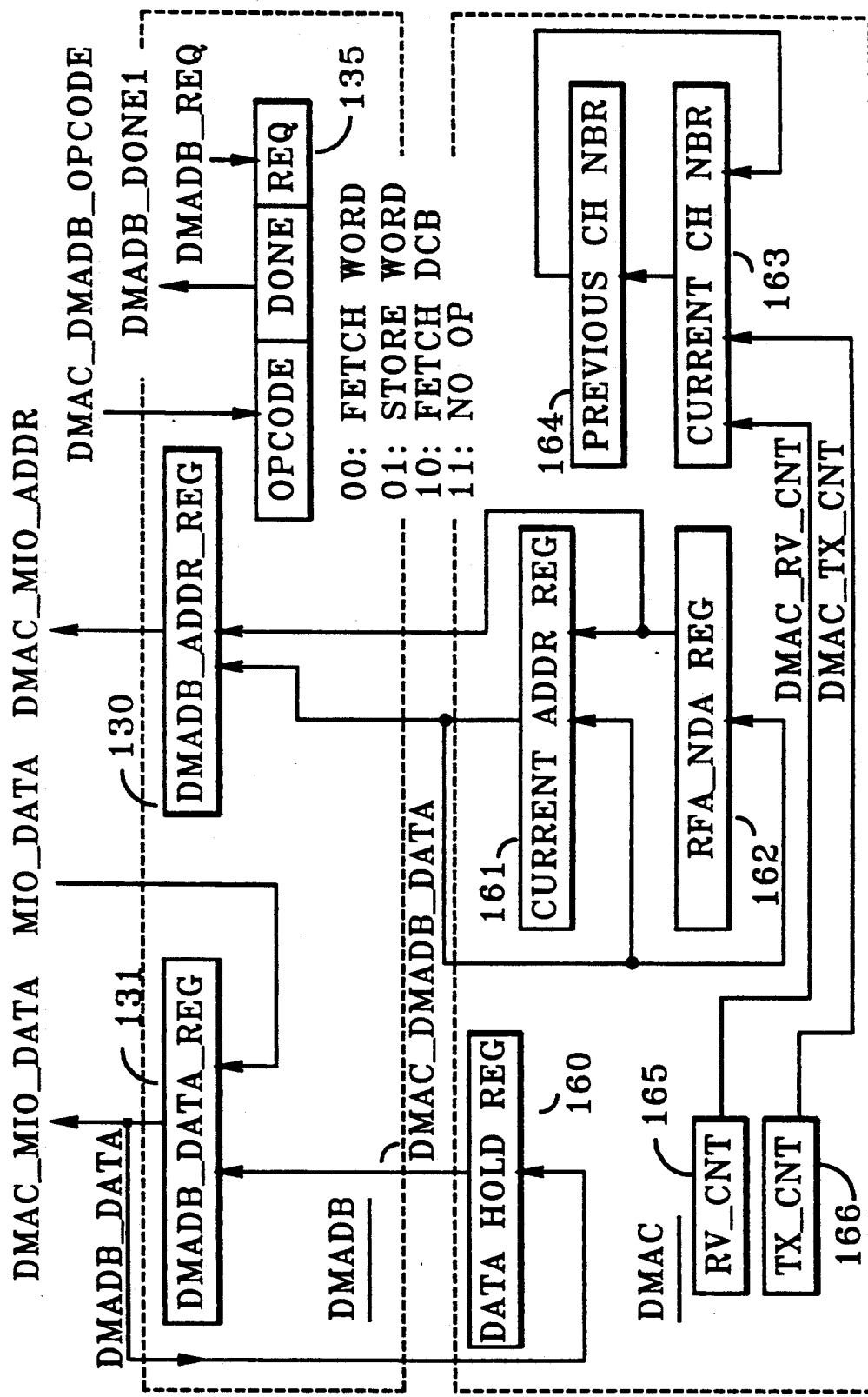
FIG. 13 is a simplified block diagram of the DMAC and DMADB units of the IIM showing their register paths and certain aspects of signal flow between the units.

FIG. 13 shows key registers of DMAC and DMADB and their interconnections. Register numbers used in the DMADB block diagram of FIG. 11 are retained in FIG. 13. DMAC registers are indicated in FIG. 13 by newly applied numbers.

Outputs of DMAC DATA HOLD register 160 (DMAC_DMADB_DATA) are transferrable to DMADB_DAT_REG 131, and outputs of register 131 (DMADB_DATA) are transferrable to register 160. Thus, receive data transferred from FIFO RAM to register 160 is transferrable further to register 130 and thence to MIO and host memory via output DMAC_MIO_DATA of register 160. Register 160 also receives transmit data and DCB information from host memory, via MIO_DATA, and can transfer such information to register 131, via DMADB_DATA, for further handling by DMAC relative to FIFO RAM and DMAC RAM.

Address information is passed from DMAC registers 161 (CURRENT ADDR REG) and 162 (RFA_NDA REG) to DMADB register 130 (DMADB_ADDR_REG) in association with transfer request OPCODE information supplied by DMAC to OPCODE latches in DMADB. These latches, shown as a separate entity labelled OPCODE in FIG. 13, are actually contained within the DMADB state machine 132 (FIG. 11). Addresses presented by DMAC in association with receive data transfers are accompanied by STORE WORD OPCODE values 01, and receive data, the latter passing from register 160 to register 131. Addresses presented by DMAC in association with transmit data fetch requests are accompanied by FETCH WORD OPCODE values 00. Addresses presented by DMAC in association with (3 word) DCB fetch requests (command chaining), are accompanied by FETCH DCB OPCODE values 10.

During preparation for transfers of transmit data and receive data relative to host memory, DMAC register 161 receives a Current Address function (fetched from DMAC RAM relative to transmit data and from FIFO RAM relative to receive data) designating an address in host memory to or from which a respective data word is to be transferred. During preparation by DMAC for chained DCB fetching, register 161 receives a Next DCB Address function (fetched from DMAC RAM) designating the address in host memory of a first of 3 DCB words to be fetched (to FIFO RAM and DMAC RAM).

Register 161 is a counting register used for incrementing address values. Accordingly, each Current Address and Next DCB Address function initially received in register 161 is transferred by DMAC to register 162 (after certain verification operations are performed by DMAC, as described later, relative to other address information initially placed in register 162), and the value held in register 161 is incremented or decremented as needed to point to a next word location in host memory.

If the operation being prepared is a receive data transfer, the updated next address value in register 161 is stored locally in FIFO RAM replacing the previous Current Address function. If the operation being prepared is a transmit data fetch, the updated next address value is stored in DMAC RAM replacing the respective previous Current Address function. In respect to either a receive data transfer or transmit data transfer, the original current address function held in register 162 is passed to DMADB register 130 as the address to be used relative to host memory in the respective word transfer operation.

If the operation being prepared is a transmit data word fetch (see Example 4 in section 9.3, below), and the control information of the respective channel indicates a depleted (zero) byte count with chaining not disallowed currently, DMAC starts DMADB and MIO on a DCB fetch relative to host system memory. The new DCB consists of 3 consecutively stored words corresponding respectively to the information stored in TDCR3, TDCR4 and TDCR1 (in DMACR and FIFO RAM). The location of the first of these words is defined in a DCB address located in DMAC register 162 which DMAC transfers to DMADB register 130 while presenting DMADB_OPCODE 10 signifying "Fetch Next DCB and setting DMADB_REQ active. At that point, DMADB and MIO operate automatically to fetch the 3 words of the next DCB in 3 successive word transfer operations on the system bus.

As successive words arrive, they are latched in DMADB data register 131, and DMADB signals respective acknowledgements DMADB_ACKn to DMAC (n=0-2). As each acknowledgement arrives, DMAC moves the respective new DCB word to one or more of its internal registers (see example 4, infra, and description of DMA_A state machine infra). As the last word is latched in DMADB register 130, DMADB signals completion indication DMADB_DONE2 and resets its request DMADB_REQ, alerting DMAC to complete its handling of the new DCB (see Example 4).

During transfers of receive and transmit data, DMAC and DMADB may operate in time overlap relative to requests of two different channels as described earlier. DMAC keeps track of channels it and DMADB are concurrently serving by means of registers 163 and 164 (CURRENT CH NBR and PREVIOUS CH NBR in FIG. 13).

As noted earlier, RCV_ARB and XMIT_ARB state machines of DMAC sequentially poll DMARQ requests, in respective receive and transmit request queues of DMARQ, using respective receive and transmit counter functions, RV_CNT and TX_CNT, to direct their polling sequences. When an active request is found, the request is scheduled for service, and a mask is set to prevent re-interrogation of that request. The receive and transmit counters are respectively indicated at 165 and 166 in FIG. 13. The state of the counter associated with initial detection of an active request corresponds to the number of the receive or transmit channel relative to which the request was set (by RFM or TFM). That count state is placed in current channel buffer register 163 (CURRENT CH NBR) to indicate the channel now selected to be served. If DMAC is waiting on DMADB for action relative to a channel request previously taken, the number of the channel associated with that previous request is transferred from register 163 to register 164.

Registers 163 and 164 are actually contained in a DMAC internal functional register described later with reference to FIG. 16. In that figure, numbers of channels instantly being served by DMAC and waiting on DMADB action are termed respectively DMAC CHN NBR and DMADB CHN NBR. Thus it will be understood that CURRENT CH NBR and DMAC CHN NBR are the same functions, and PREVIOUS CH NBR and DMADB CHN NBR are the same functions.

9.2 Formats of TDCR and RDCR Control Information Words

In order to understand the channel request operations performed by DMAC and DMADB it is useful to know the format of information stored in the transmit and receive control word spaces spaces allocated to each channel in FIFO RAM and DMAC RAM (TDCR1-TDCR4 and RDCR1-RDCR4), and associated functions. Formats of TDCR and RDCR parameters are shown respectively in FIGS. 14 and 15. Related functions are listed below. Each TDCR and RDCR resides in a 32 bit space and contains up to 32 bits of information arranged in units of various bit lengths.

Referring to FIG. 14, TDCR2 holds up to a word of transmit date in 4 transmit data byte (TDB) units. The other three word spaces, TDCR1, TDCR3 and TDCR4 together, serve to contain a Device Control Block (DCB) defining the operation of a respective transmit channel. As noted earlier, DCB's are chainable through DCB fetching operations (to be described in detail below). The initial DCB of any chain (the DCB loaded when the channel is first activated or reactivated), is loaded initially by the host processor acting through the slave I/O (SIO) unit (FIG. 2), and relative to channels designated for DCB chaining further DCB's are fetched by operations of DMAC, DMADB and MIO. The first word of the DCB resides in the TDCR1 space of the channel in FIFO RAM and the other two words of each DCB reside in TDCR3 and TDCR4 spaces in DMAC RAM.

TDCR1 (FIG. 14) holds 7 units of control information in 25 bits, and has 7 unused/reserved bit spaces (RES). The 7 units of control information include three 1-bit units, three 2-bit units and one 16-bit unit. These units and their functions are:

ECD  End Of Chain Detected bit. This bit is set by DMAC when the value of the transmit Data byte count TDBC becomes 0 and (host programmed) end of chain indicator bit ECI in TDCR4 indicates that the presently stored DCB is the last of a chain. This bit is monitored by TFM, and when set passed by TFM to the next synchronous transmit data handling unit (15, FIG. 2) so that the latter can append Cyclic Redundancy Check (CRC) characters followed by IDLE characters, if the transmit data is HDLC formatted, or IDLE characters otherwise to indicate that the respective channel has become inactive. TFM also reacts to this bit by refraining from entering further requests into DMARQ even though transmit data buffer TDCR2 is empty.

EFD  End Of Frame indicator bit. This is set by DMAC when the byte count TDBC becomes 0 and (host programmed) end of frame indicator bit EFI in TDCR4 indicates that the transmit data associated with this byte count is the last data of a protocol last byte of transmit data in a protocol formatted frame. This bit is monitored by TFM, and when set passed by TFM to the next transmit handling unit 15 to cause the latter to append an end of frame flag character and CRC character behind the last significant transmit data byte.

NDI  No Data Indicator bit. This bit is set if a DCB contains a 0 byte count TDBC when it is received and either the ECI or EFI bit in TDCR4 is set.

TBC  Transmit Buffer Count. This 2-bit count indicates the number of data bytes currently available in transmit data buffer TDCR2. This count is decremented by TFM as transmit data bytes are removed from the buffer.

TOPQ  Top Of Queue indicator. Points to the next byte in the transmit data buffer which is to be gated out by TFM to the other transmit data handling synchronous units.

PE  Data parity error indication set by DMAC when it receives parity error indication relating to access to FIFO RAM, DMAC RAM or host memory.

TDBC  Transmit Data Byte Count defining the number of bytes of transmit data left in the data segment currently being accessed in host memory.

TDCR3 contains 8 unused (reserved) bit spaces and 24 bit spaces assigned to hold address information TDBA (Transmit Data Buffer Address) designating the location in host memory from which the next transmit data word is to be fetched.

TDCR4 contains 10 unused (reserved) bit spaces, two bit spaces for host programmable end indicator bits ECI (End Of Chain Indicator bit) and EFI (End Of Frame Indicator bit) discussed above relative to ECD and EFD bits, and a 24-bit DCB Address field (DCBA) indicating the address in host memory of the first word of the next DCB (if chaining is indicated).

Referring to FIG. 15, RDCR2 holds up to a word of receive data in 4 receive data byte units (RDB1–RDB4). The other three receive data control word registers, RDCR1, RDCR3 and RDCR4 contain information defining characteristics of a circular buffer space in host memory in which receive data is being stored. A separate circular buffer space is assigned to each receive channel, and managed by the host processing system. When receive data placed in a channel's circular buffer by the IIM is handled in proper coordination by the host processor system, boundary pointers advance in coordination with IIM processes relative to the respective channel and the process never overflows beyond boundaries. The circular buffer management per se is described in the above-mentioned copending patent applications and is not part of the present invention.

RDCR1 contains 8 unused/reserved bit spaces, 2 bit spaces for indicator bits RBC (Receive Boundary Check bit) and RPE (Receive Parity Error bit) and a 22-bit space for address parameter RDCA (Receive Data Buffer Current Address). RBC is set when DMAC detects that address RDCA is out of bounds defined by other address parameters discussed below. RPE is set when DMAC receives a parity error indication relative to host memory or local RAM's. RDCA designates the next address in the above-mentioned circular buffer space at which receive data is to be stored.

RDCR3 contains 2 unused/reserved bit spaces, 8 bit spaces allocated to address parameter RDLAH (Receive Data Last Address High) and 22 bits dedicated to address parameter RDFA (Receive Data Buffer First Address). RDLAH contains the 8 high order bits of the last (within bounds) address in the host memory circular buffer space. RDFA designates a first address in the respective channel's circular buffer space.

RDCR4 contains a 12-bit address parameter RDLAL (Receive Data Last Address Low) and a 20-bit address parameter RDBA (Receive Data Boundary Address). RDLAL contains the low order 12 bits of the last/top address in the circular buffer. This and the RDLAH in RDCR3 make up the 20-bit last address. RDBA defines a boundary address which if passed represents a buffer overrun (e.g. overwriting of previous receive data).

9.3 Examples of Adaptive Pipeline Usage In Data Transfers and DCB Fetching

Since the DMAC and DMADB can operate in time overlap relative to different channels, and are effectively decoupled in respect to their actions relative to any single channel, their registers form a pipeline effectively reducing time constraints on both units in respects to transfers relative to all channels. The pipeline is adaptive in that it can only serve a single channel during transmit DCB fetching. The following examples should illustrate how the two units operate when both units are performing time overlapped handling of requests relative to different receive channels, both are performing time overlapped handling of requests relative to different transmit channels, both are performing time overlapped handling of requests relative oppositely directed channels (one a receive channel and the other a transmit channel), and when both are handling DCB fetching relative to one transmit channel. The time and general functional frame of reference in each example may be taken as the events associated with interval 50 in FIG. 2, and FIG. 13 may be used as the frame of reference for registers mentioned in the examples.

EXAMPLE 1

DMADB Doing Data Transfer Relative To A Receive Channel C2, DMAC Preparing A Transfer Relative To A Receive Channel C3

In this circumstance, while DMAC is fetching all 4 of C3's RDCRn/C3 words (n=1–4)—via simultaneous application to FIFO RAM and DMAC RAM of 2 word read requests defined respectively by DMAC_B_OPCODE and DMAC_C_OPCODE functions—D-

MADB is operating tightly interlocked with MIO to conduct a transfer relative to the circular buffer storage space in host memory assigned to C2, and DMAC and DMADB are effectively decoupled at this time. When DMADB finishes the store operation relative to C2 it resets DMADB_REQ to 0, indicating its availability for other service, and also resets the DMARQ receive request bit relative to C2.

In DMAC, RDCR2/C3 (latest receive data of C3) is placed in DATA HOLD REG 160, while RDCR1/C3 is placed in CURRENT ADDR REG 161 and RDCR3/C3 is put in RFA_NDA REG 162 and RDCR4/C3 is put in Receive Boundary Circular Buffer Address register RBCA (see FIG. 10). After verifying that the current address RDCA, in register 161, is within bounds defined by terms in register 162 and register RBCA (and assuming that it is within bounds), DMAC transfers the current address value to register 162 and updates the same value stored in register 160 (register 160 is a counting register) to indicate a next address location in the circular buffer space assigned to C3. The updated next address value is stored back into C3's RDCR1 space in FIFO RAM (via a DMAC 1-word Write request to FIFO RAM request latches 85, FIG. 8).

Contingent on REQ bit value being 0/reset, in REQ part of DMADB register 135, DMAC transfer Store Word OPCODE 01 to DMADB OPCODE register and C3 current address from register 162 to DMADB register 130 (if the REQ bit is not 0, DMADB is still busy relative to C2 and DMAC waits). At same time, DMAC passes C3 receive data from DMAC register 160 to DMADB register 131, and sets DMADB_REQ to busy state 1. Thereafter DMADB carries on with C3 Store transfer.

EXAMPLE 2

DMADB Doing Data Transfer Relative To Transmit Channel C2, DMAC Preparing A Transfer Relative To Transmit Channel C3

While DMAC fetches words TDCRn/C3 (n=1-4)—via simultaneous application to FIFO RAM and DMAC RAM of 2 word read requests defined respectively by DMAC_B_OPCODE and DMAC_C_OPCODE functions—DMADB operates tightly interlocked with MIO to conduct transmit data transfer relative to a host memory space assigned to C2. DMAC and DMADB are effectively decoupled at this time. When DMADB receives the C2 transmit data it resets DMADB_REQ and sets DONE1.

In DMAC, TDCR1/C3, containing the transmit byte count for C3, is placed in DMAC register RLA_TBC, TDCR3/C3 containing transmit data buffer address TDBA is placed in current address register 161, and TDCR4/C3 (next DCB address) is placed in RFA_NDA register 162.

After verifying that the transmit byte count is not 0, and that host programmed end of chain and end of frame indicators do not indicate a respective ending condition, DMAC continues preparation for fetching C3 transmit data. If transmit byte count is 0 and end of chain is not indicated, DMAC initiates DCB fetching (see example 4). Assume byte count is not 0.

Next, DMAC transfers C3 current address from register 161 to register 162, updates address in register 161 to indicate next data buffer address and stores that value back in DMAC RAM space for TDCR3/C3. Also, the byte count in RLA_TBC is updated and stored back in FIFO RAM at TDCR1/C3.

Contingent on values of DMADB_REQ being 0 (reset) and DMADB_DONE1 being 1 (indicating in effect that DMADB has finished fetching C2 transmit data to register 131), DMAC transfers C2 transmit data from register 131 to register 160 while transferring C3 current data buffer address from register 162 to register 130. Simultaneously, DMAC presents a Fetch Word OPCODE 00 to DMADB and sets DMADB_REQ to busy state 1. Thereafter, DMAC and DMADB operate decoupled; DMAC to store C2 transmit data in TDCR2/C2 space in FIFO RAM, and DMADB in tight cooperation with MIO to fetch C3 transmit data from host memory. While storing the C2 transmit data in FIFO RAM, DMAC resets the DMARQ transmit request bit of C2.

EXAMPLE 3

DMADB Doing XMIT Data Fetch Relative To Transmit Channel C2, DMAC Preparing RCV Data Store Transfer Relative To Receive Channel C3

While DMAC fetches all of C3's RDCRn/C3 words (n=1-4), as in example 1, DMADB operates tightly interlocked with MIO to conduct transmit data fetch for C2 relative to host memory. DMAC and DMADB are effectively decoupled at this time. When it finishes the C2 operation, DMADB resets DMADB_REQ to 0.

As in example 1, current circular buffer address for C3 is placed in DMAC register 161, and verified to be within boundary limits defined by other RDCR parameters. Then, current address is transferred to register 162, updated in register 161, and updated value is stored back in FIFO RAM as in example 1.

Contingent on DMADB_REQ bit being 0 and DMADB_DONE1 being 1, to indicate completion of C2 transmit data fetch relative to DMADB register 131, DMAC swaps C3 receive data for C2 transmit data (placing C3 receive data in register 131 and C2 transmit data in register 160), transfers current C3 transmit data buffer address from register 162 to DMADB register 130, presents Store Word OPCODE 01 to DMADB, sets DMADB_OPCODE to 1.

Then DMAC and DMADB act decoupled while DMAC stores C2 transmit data in FIFO RAM and DMADB transfers C3 receive data to storage in C3's circular buffer space in host memory. While storing the C2 transmit data, DMAC resets the C2 transmit request bit in DMARQ.

EXAMPLE 4

DMADB Operating Relative Any Channel C2, DMAC Responding to Request From XMIT Channel C3 Encounters Condition Requiring DCB (3 word) Fetch From Host Memory To TDCR3/C3 in FIFO RAM.

While DMAC fetches TDCRn/C3 (n=1-4), as in example 2, DMADB operates tightly interlocked with MIO and decoupled from DMAC to conduct data transfer relative to C2. For simplicity, assume DMADB is transferring C2 receive data to host memory, and when done will reset DMADB_REQ and C2's DMARQ rcv request so DMAC has nothing more to do for C2.

Assume relative to C3 that transmit data byte count is 0 and programmed indicator ECI does not show end of chain. This is detected by DMAC as indication that a 3-word DCB fetch is required relative to C3. Upon detecting this, DMAC transfers current channel number from register 163 to PREVIOUS CH NBR register 164.

Contingent on DMADB_REQ being 0, DMAC transfers C3's Next DCB Address DCBA from DMAC register 162 to DMADB register 130, sets DMADB_REQ to 1, and presents Fetch DCB OPCODE 10 to DMADB. This starts DMADB and MIO on a series of 3 DCB word fetches from host memory for C3. These 3 words, in the order of their fetching from host memory, correspond to the information stored in TDCR3, TDCR4, and TDCR1 (in DMACR and FIFO RAM).

As DMADB retrieves the first DCB word from host memory, that word is latched in DMADB_DATA_REG and DMADB_ACK0 is presented to DMAC. In response, DMAC latches the first DCB word (containing the new Transmit Data Buffer Address) into its CURRENT ADDR REG, replacing the "old" TDBA address therein with the TDBA address of the new DCB.

As DMADB retrieves the second DCB word, it latches that word in DMADB_DATA_REG and presents DMADB_ACK1 to DMAC. In response, DMAC latches the second DCB word (containing the new next DCB Address) into its RFA_NDA REG replacing the old next DCBA function. In addition, the DMAC state machine DMA_A latches the ECI and RFI bits in the new second DCB word.

As DMADB retrieves the third/last DCB word, it latches that word into DMADB_DATA_REG, presents DMADB_DONE2 and DMADB_ACK2 to DMAC, and resets DMAD_REQ (indicating DMADB's completion of the 3 word fetch operation). In response, DMAC latches the third DCB word (containing the new Transmit Data Byte Count parameter TDBC) into its RLA_TBC register replacing the old transmit byte count factor therein).

Recognizing from the DONE2 indication that it now has latched all of the new DCB information, DMAC examines the new transmit byte count. If the new count is 0 (indicating receipt of an "empty DCB"), and the new ECI and EFI indicators indicate end of chain or end of frame, DMAC stores the new DCB information in DMAC RAM and FIFO RAM and resets the DMARQ transmit data request which instigated the new DCB fetch operation. If the new byte count is 0 and the new ECI and EFI indicate neither end of chain nor end of frame, DMAC turns on the NDI indicator in TDFSW, sets bits ECD and EFD in that field to values of ECI and EFI respectively, and stores the new DCB in DMACR and FIFO RAM, without resetting C3's DMARQ request (this allows DMAC to service one or more other requests before it returns to the unreset C3 request). If the new transmit byte count is not 0, DMAC transfers the contents of CURRENT_ADDR_REG to DMADB_ADDR_REG, sets DMADB_REQ on, and presents DMADB_OPCODE 00 (Fetch Word) to start DMADB off on fetching the first word of transmit data relative to C3 as designated by the newly fetched DCB.thereby starting DMADB/MIO off immediately on a first transmit data fetch for C3, relative to the newly retrieved DCB.

While DMADB/MIO are operating on this request, DMAC updates the current address value in register 161 and the transmit byte count in RLA_TBC, and stores the third received DCB word (including the updated byte count) into FIFO RAM. Simultaneously, stores the updated first and second received words of the new C3 DCB into DMAC RAM (via a 2-word write request to that RAM), and starts servicing another channel's DMARQ request if one is pending (notice that the original request for C3 transmit data, which gave rise to the new DCB fetch, is not reset until after the first transmit data word designated by that new DCB is received by DMAC). Thus, the pipeline of DMAC and DMADB registers is immediately capable of operating in time overlap relative to two channels as soon as the third word of a DCB fetch is received by DMAC.

Relative to the above case where the byte count is zero and neither end indicator, ECI or EFI, is on (where the DCB was stored locally without resetting the C3 DMARQ request), when DMAC returns to servicing the associated C3 DMARQ transmit data request (after servicing other channel requests as needed), it fetches the new DCB control information, re-detects the 0 count with no end indication, and starts DMADB on another DCB fetch relative to C3 (this time relative to the new DCB address contained in the last-received DCB).

10. MIO Bus Hold Operations

MIO is in essence logically and functionally identical to the MIO unit described in the copending patent applications referenced earlier, with the exception of a Micro Channel Bus Hold feature described next. MIO Timer unit 147 (FIG. 12) provides certain of the contingency inputs relative to this feature. The following discussion should be read with reference to FIG. 12.

As noted earlier, devices attached to the Micro Channel bus signal for access to the bus via line Preempt. When the bus is available for access, a central controller associated with the host processor (not shown in any of the present drawings) provides an arbitration grant signal on line ARB_GNT (FIG. 12). Devices requiring access then evaluate level indications on the bus, and remove themselves from arbitration contention if they find external level indications higher than their own. Eventually, one device remains in contention, the arbitration cycle is concluded, and the prevailing device wins (takes control of) the bus (activating CMD line). For efficient system operation it is important that each device controlling the bus not unduly extend its control.

Devices actively arbitrating and failing to win control may continue to drive their Preempt lines active. The external arbitration controller continually monitors CMD and Preempt lines, CMD determine when a device has taken control of the bus and Preempt to determine the state of arbitration contention after control has started. At about 7.8 microseconds after Preempt goes active, or 7.8 microseconds after control has started if Preempt was active at the start, the arbitration controller issues another arbitration grant to start another cycle of bus arbitration and control. Accordingly, a device controlling the bus must be ready to relinquish control within 7.8 microseconds of either the time Preempt goes from inactive to active or from the time it took control if Preempt was then active.

This presents a problem in respect to the present IIM design. Since DMAC and MIO/DMADB are effectively decoupled during short intervals of time in which DMAC is preparing an operation relative to one channel while MIO and DMADB are already DONE with an operation relative to another channel. At such times, if MIO immediately relinquished the bus, the pipeline of DMAC and DMADB would be half full (in DMAC)

requiring MIO to re-arbitrate for the bus, with possibly another 200 microsecond delay before gaining control while DMAC and the channel whose request it was servicing when control was relinquished are effectively blocked. This could result in undesired performance impacts.

Recognizing that such decoupling instants, when DMAC is actively handling another channel request, would of necessity be very short (at most several internal machine cycles of MIO/DMADB operation), it was decided to adapt MIO to delay the point at which it relinquishes the bus, after reaching DONE state, by a corresponding period spanning the several cycle gap. Thus, MIO continues to hold/control the bus for that length of time (about 0.4 microseconds) after reaching DONE state, and relinquishes the bus after that time if it has not received a read or write action request from DMAC/DMADB in the interim. If MIO does receive a read or write request during this "Bus Hold" interval it retains control as if there had been no idle interval.

Their are exceptions to this bus holding action. When MIO gets control of the bus, it monitors Preempt, and when Preempt either goes active or if it is active at the start of bus control, MIO conditions its internal timer 147 to begin a timeout lasting for a little longer than 6 microseconds. If MIO receives a read or write request from DMAC/DMADB while the timer count is less than 4 microseconds into this timeout, the requested action is initiated. If MIO receives a request when the timer count is between 4 and 6 microseconds, the requested action is started only if it is other than a DCB fetch request; i.e. only if it is a request for transferring receive data or transmit data. If a request is received after 6 microseconds no action is taken.

Thus, when MIO is in a DONE condition and its timer indicates less than 4 microseconds elapsed (since Preempt active), the bus is held for the additional hold period. However, if MIO is DONE and its timer indicates between 4 and 6 microseconds, the bus is held, but it is used only if a request for other than for a DCB fetch is received. Finally, if MIO is DONE, and its timer indicates more than 6 microseconds elapsed, MIO immediately relinquishes control of the bus.

11. State Machine Details

State machines of present interest are those in DMAC, DMADB and MIO (in respect to MIO, the state machine functions of present interest are those relating to bus hold, inasmuch as all other functions of MIO are logically identical to those of the MIO used in the IDLC device of the copending patent applications). Relative to each state machine, functions of the external inputs and outputs of the logic will be described first, and then details of the state machine states and transitions between states will be given. In respect to the DMAC state machines, the inputs and outputs of the aggregate set 103 as shown in FIG. 10 will be listed first before the descriptions of the individual state machines are given. Descriptions of the state machine states and their transitions are deemed to completely define the underlying logic for persons of reasonable skill in the design of logic circuits.

11.1 DMAC State Machines

State machines 103 (FIG. 10) comprise 5 tightly coupled state machine units: DMA_A, DMA_B, DMA_C, RCV_ARB, and XMIT_ARB. External inputs to and outputs of these units are described in this section. Descriptions of the units, their states and their state transitions are given in separate sub-sections.

DMA_A coordinates operations of the other 4 state machines. DMA_B controls DMAC access to FIFO RAM. DMA_C controls DMAC access to DMAC RAM. RCV_ARB and XMIT_ARB respectively control polling of receive and transmit channel requests in DMARQ.

State machines 103 exchange information via an internal functional register shown in FIG. 16. Names of information units in this register, and their bit widths are indicated in the drawing and defined below.

| | |
|---|---|
| DMA_B_REG: | Request bit set by DMA_A and reset by DMA_B state machines. When set, DMA_B is requested to access FIFO RAM for operation defined by DMA_B_OPCODE. |
| DMA_B_OPCODE: | Set by DMA_A as instruction to DMA_B to perform one of 7 operations relative to FIFO RAM as follows: |

| OPCODE | OPERATION |
|---|---|
| 001 | Read rcv data bfr address (RDBA) |
| 001 | Write updated RDBA |
| 010 | Write RDBA and reset DMARQ request bit |
| 011 | Read transmit data byte count (TDBC) |
| 100 | Write TDBC |
| 101 | Write transmit data and reset DMARQ request bit |
| 110 | Write TDBC and reset DMARQ request bit |

| | |
|---|---|
| DMA_C_REQ: | Set by DMA_A and reset by DMA_C. When set, requests DMA_C to access DMAC RAM for operation defined by DMA_C_OPCODE. |
| DMA_C_OPCODE: | DMA_A's instruction to DMA_C to do one of following 4 operations relative to DMAC RAM: |

| OPCODE | OPERATION |
|---|---|
| 00 | Read receive first, last and boundary addresses from DMAC RAM |
| 01 | Read transmit data buffer address, next DCB address, ECI and EFI |
| 10 | Write transmit data buffer, next DCB address, ECI and EFI |
| 11 | Write transmit data buffer address |

| | |
|---|---|
| DMAC_DMADB_OPCODE: | Set by DMA_A as instruction to DMADB (store receive data, fetch transmit data, or fetch 3 word DCB) |
| RCV/XMIT: | Indicates current service of DMA_A. If set, a rcv channel is being serviced, if not set a transmit channel is being serviced. |
| DMAC/MASK: | Used to mask out channel request bit that is in service so as to prevent duplicate selection of the same DMARQ request. |
| DMADB/MASK: | Used to mask the request of a previously prepared channel which is currently being served by DMADB/MIO. |

| | |
|---|---|
| DMAC/CHN_NBR: | Number identifying channel associated with unmasked request currently in service in DMAC (see DMADB_CHN_NBR). Used to direct resetting signals to DMARQ request latches and to address FIFO RAM and DMAC RAM. Also used with RCV/XMIT and DMAC_MASK to mask out an already selected request to avert duplicate selection of the same channel request. |
| DMADB_CHN_NBR: | Number of channel associated with request currently being served by DMAC/MIO. Usage similar to that of DMAC_CHN_NBR but in combination with DMADB_MASK and DMAC_DMADB_OPCODE. |
| DMACR_PE: | Set by DMA_C to indicate receipt of parity error indication from DMAC RAM during read access; serves to notify DMA_A of this error status. |
| FIFO_PE: | Set by DMA_B to notify DMA_A of receipt of parity error indication from FIFO RAM during read access. |

In alphabetic sequence, inputs received by units 103 are:

| | |
|---|---|
| DMACR_ACK: | Acknowledgement by DMAC RAM of action on request set by DMAC |
| DMACR_ERROR: | Parity error indication from DMAC RAM to DMAC (shown in this form in FIG. 10 and as DMARC_PARITY_ERROR in FIG. 9). |
| DMADB_ACK0: | Acknowledgement to DMAC that first word of next DCB has been retrieved by DMADB/MIO. |
| DMADB_ACK1: | Acknowledgement to DMAC that second word of next DCB has been retrieved by DMADB/MIO. |
| DMADB_ACK2: | Acknowledgement to DMAC that third word of next DCB has been retrieved by DMADB/MIO. |
| DMADB_DONE1: | Completion indication by DMADB to DMAC relative to a transmit data fetch from host memory. |
| DMADB_DONE2: | Completion indication by DMADB to DMAC relative to DCB fetch. |
| DMADB_MASK_RESET: | Signal used by DMADB to reset DMADB_MASK bit in DMAC functional register (FIG. 16). |
| DMADB_REQ: | Request bit in DMADB (FIGS. 11, 13) set to 1 by DMAC to initiate an operation by DMADB/MIO relative to host memory, and reset to 0 by DMADB when the operation is done. |
| FIFO_ACK: | Acknowledgement from FIFO RAM to DMAC (shown in this form in FIG. 10 and as DMAC_ACK in FIG. 8) |
| FIFO_ERROR: | Indication of parity error from FIFO RAM |
| MIO_PE: | Indication of parity error from MIO/DMADB |
| RCV_REQ: | Request bit selected from DMARQ receive queue |
| T/F: | True/False indication from 2 out of 3 compare circuit 101 (FIG. 10) |
| XMIT_REQ: | Request bit selected from DMARQ transmit queue |

In alphabetic sequence, outputs from units 103 to other IIM units are: Data FIFO Status Word). Also, where not explained below refer to earlier discussions of FIGS. 14 and 15 for meanings and locations of: TDBC, TDBn (n=1–4), TDBA, ECI, RFI, DCBA, RBC, RPE, RDC, RDBn (n=1–4), RDLAH, RDFA, RDLAL, and RDBA.

| | |
|---|---|
| CTL: | Controls gating of information into and out of DMAC registers |
| DMAC_A_SWAP: | Signal used to transfer an address from DMAC to DMADB (either DMADB_ADDR1 or DMADB_ADDR2 as shown in FIG. 10) |
| DMAC_D_SWAP: | Signal used to transfer data from DMAC DATA HOLD register to DMADB_DATA_REG |
| DMAC_B_OPCODE: | Instruction from DMA_A to DMA_B defining operation to be performed by FIFO RAM |
| DMAC_C_OPCODE: | Instruction from DMA_A to DMA_C defining operation to be performed by DMAC RAM |
| DMAC_CH_NBR: | Identification of channel currently being served in DMAC |
| DMADB_CH_NBR: | Identification of channel currently being served in DMADB/MIO |
| DMAC_DMACR_REQ: | Request for DMAC access to DMAC RAM |
| DMAC_DMADB_DRST: | Resets DONE1 latch in DMADB |
| DMAC_DMADB_OPCODE: | Instruction from DMAC to DMADB defining operation to be performed relative to host memory as one of: Fetch Transmit Data (word), Store Receive Data (word) or Fetch DCB (3 words) |
| DMAC_DMADB_REQ: | Sets DMADB REQ latch to initiate DMADB/MIO operation |
| DMAC_FIFO_REQ: | Request for DMAC access to FIFO RAM |
| DMAC_RCV_RESET: | Used to reset request in DMARQ receive queue |
| DMAC_RV_CNT: | Output of 3-bit counter used by RCV_ARB state machine to poll requests in DMARQ receive queue |
| DMAC_TX_CNT: | Output of 3-bit counter used by XMIT_ARB state machine to poll requests in DMARQ transmit queue |
| DMAC_XMIT_RESET: | Used to reset request in DMARQ transmit queue |

11.1.1 DMA A State Machine

In the following descriptions, the first byte of TDCR1 (FIG. 14, items ECD, EFC, NDI, TBC, TOPQ and PE) is referred to as TDFSW (Transmit Data FIFO Status Word).

DMA_A coordinates operations of the other 4 DMAC state machines. States, state transitions and operations evoked by DMA_A are:

State 0: Arbitration State. Prioritizes service requests giving highest priority to requests in DMARQ receive queue, next highest priority to requests in DMARQ transmit queue, and lowest priority to DMADB requests (DMADB_REQ set to 0). This state entered either from other states or if DMAC is reset.
If a RCV_REQ from DMARQ is active, activate (turn on) DMAC functional register (FR) bits DMAC_MASK, RCV_XMIT, DMA_B_REQ, and DMA_C_REQ, latch receive count value in DMAC_CHN_NBR space of FR, signal acknowledge to RCV_ARB state machine, set DMA_B_OPCODE and DMA_C_OPCODE both to 000, and go to state 1.
If a XMIT_REQ from DMARQ is active, activate FR bits DMAC_MASK, DMA_B_B REQ, and DMA_C_REQ, deactivate/reset FR RCV/XMIT bit, latch TX_CNT in FR field DMAC_CHN_NBR, set DMA_B_OPCODE to 01, set DMA_C_OPCODE to 011, and go to state 2.
If DMADB_DONE1 is on, load DMADB_MASK into DMAC_MASK and reset DMADB_MASK, set RCV/XMIT bit off, load DMADB_CHN_NBR into DMAC_CHN_NBR, reset DMADB_DONE1 (by asserting DMAC_DMADB_DRST), load data from DMADB_DATA into DATA HOLD REG, set DMA_B_REQ bit, set DMA_B_OPCODE to 101, and go to state 4.
If none of the above, stay in State 0.

State 1: Wait for both DMA_B and DMA_C state machines to be done fetching receive channel information.
If both DMA_B_REQ and DMA_C_REQ are both off, check for parity errors relative to FIFO RAM and DMAC RAM (by examining FR bits DMACR_PE and FIFO_PE). If parity error occurred, assert DMAC_PARITY_ERROR to INT (FIG. 2), set bit 9 in CURRENT ADDRESS REG, transfer content of CURRENT ADDRESS REG to DMAC_FIFO_DATA bus (DMA_B will cause the data to be written into FIFO RAM at RDCR1 of corresponding channel), set DMA_B_REQ bit in FR, set DMAC_B_OPCODE in FR to 010, and go to state 4.
If there was either parity error or boundary check condition before, assert DMAC_RCV_RESET to DMARQ if RCV_XMIT bit is on, else assert DMAC_XMIT_RESET. Go to State 4.
if boundary check condition occurs now (result of RBCA REG and CURRENT ADDR REG comparison), set RBC bit in CURRENT ADD REG, set DMA_B_REQ bit, set DMA_B_OPCODE in FR to 010, and go to state 4.
If end of rcv circular buffer condition is found, check if beginning of rcv buffer is protected. If protected, a boundary check condition is indicated and above action is taken associated with that condition.
If at end of rcv circular buffer and beginning of buffer not protected, load RFA_NDA+1 into CURRENT ADDR REG, set DMA_B_REQ bit, set DMA_B_OPCODE to 001, and go to state 6.
If not at end of rcv buffer, put content of CURRENT ADDR REG in RFA_NDA, increment CURRENT ADDR REG, set DMA_B_REQ bit, set DMA_B_OPCODE to 001, and go to state 6.
If neither DMA_B_REQ nor DMA_C_REQ bit is off, either DMA_B OR DMA_C is not DONE. Stay in this State and Wait.

State 2: Wait for both DMA_B and DMA_C state machines to finish fetching control information for this transmit channel.
If both DMA_B_REQ and DAM_C_REQ are off, check for parity errors in FIFO RAM and DMAC RAM. If there is error, assert DMAC_ERROR to INT. Transfer DMACR_PE and FIFO_PE bits to bits 8 and 9 of DATA HOLD REG. Put output of DATA HOLD REG on DMAC_FIFO_DATA bus for storage in FIFO RAM by DMA_B state machine. Set DMA_B_REQ bit on, set DMA_B_OPCODE to 110, go to State 4.
If there was parity error in previous service to same channel, assert DMAC_XMIT_RESET to DMARQ and go to state 4.
If content of RLA_TBC register is 0, indicating depletion of transmit data buffer for current DCB, check if DMADB has outstanding transmit data needing to be stored into TDCR2 space of respective channel in FIFO RAM, by monitoring DMADB_DONE1. If DMADB_DONE1 active, load DMADB_DATA into DATA HOLD REG, swap DMAC_CHN_NBR with DMADB_CHN_NBR, swap DMAC_MASK with DMADB_MADK, reset RCV/XMIT bit in FR, set DMAC_DMADB_OPCODE to 10 (Fetch DCB; note that DMADB_REQ is not yet set), assert DMAC_DRST to reset DONE1 IN DMADB, set DMA_B_REQ bit, set DMA_B_OPCODE to 101 Data ), and go to state 5.
If DMADB_DONE1 is off, check if DMADB is busy by monitoring DMADB_REQ status. If DMADB_REQ is on, stay in state 2 and wait for DMADB to be free.
If DMADB is not busy, set DMADB_REQ BIT, set DMAC_DMADB_OPCODE to 10 (fetch DCB), put DMADB_ADDR1 in DMADB_ADDR_REG, load DMAC_MASK into DMADB_MASK and reset DMAC_MASK, load DMAC_CHN_NBR into DMADB_CHN_NBR, and go to state 8.
If transmit byte count not 0, put content of CURRENT ADDR REG into RFA_NDA REG, increment CURRENT ADDR REG, set TOPQ and TBC of TDFSW, decrement transmit byte count, and go to state 7.
If neither DMA_B nor DMA_C state machine done, stay in State 2 and wait for then to be done.

-continued

State 3: Wait for both DMA_B and DMA_C state machines to be done writing for a transmit request.
If both DMA_B_REQ and DMA_C_REQ are off, check DMADB_DONE1 to see if DMADB has transmit data waiting to be fetched to DMAC. If DMADB_DONE1 is on, set DMAC_DMADB_OPCODE to 00 (fetch word), load DMADB_ADDR1 into DMADB_ADDR_REG, reset DMADB_DONE1, reset RCV/XMIT bit in FR, set DMADB_REQ bit on, swap DMAC_MASK with DMADB_MASK, swap DMAC_CHN_NBR with DMADB_CHN_NBR, load DMADB_DATA into DMAC DATA HOLD REG, set DMA_B_REQ bit on, set DMA_B_OPCODE to 101, and go to state 9.
If DMADB_DONE1 is off, but DMADB_REQ is on, stay in state 3 and wait until DMADB_REQ is off.
If neither DMADB_DONE1 nor DMADB_REQ is on, set DMAC_DMADB_OPCODE to 00, set DMADB_REQ bit on, load DMAC_MASK into DMADB_MASK and reset DMAC_MASK, load DMAC_CHN_NBR into DMADB_CHN_NBR, load DMADB_ADDR1 into DMADB_ADDR_REG, and go to state 0.

State 4: Wait for DMA_B State Machine to be done writing error indication to FIFOR
If DMA_REQ is off, check if DMADB_DONE1 is on (outstanding transmit data). If on, reset DMADB_DONE1, load DMADB_MASK into DMAC_MASK and reset DMADB_MASK, load DMADB_CHN_NBR into DMAC_CHN_NBR, reset RCV/XMIT bit, load DMADB_DATA into DATA HOLD REG, set DMA_B_REQ bit on and DMA_B_OPCODE to 101, stay in state 4.
If DMADB_DONE 1 is off, reset DMAC_MASK, go to state 0.

State 5: DMA_A state machine waits for DMA_B state machine to be done storing transmit data into respective TDCR2, so DMA_A can start DMADB on DCB fetch (in this instance, the transmit data is the last data designated by the previous command, chaining is not ended and this data fetch depletes the transmit byte count to 0 calling for a DCB fetch). DCB fetch requires use of registers which DMA_B could be using; hence need for wait.
If DMA_B_REQ off, set DMADB_REQ on and go to state 8.

State 6: DMA_A waits for DMA_B to be done updating receive data buffer address to FIFO RAM.
If DMA_B_REQ off, check DMADB_DONE1 bit to see if there is outstanding transmit data to store in TDCR2 of respective chl. If there is, reset DMADB_DONE1, set DMAC_DMADB_OPCODE TO 01 (store word), swap DMAC_MASK with DMADB_MASK, swap DMAC_CHN_NBR with DMADB_CHN_NBR, swap DMADB_DATA_REG with DATA HOLD REG, put DMADB_ADDR1 into DMADB_ADDR_REG, reset RCV/CMIT, set DMADB_REQ, set DMA_B_REQ, set DMA_B_OPCODE to 101, go to state 4.
If DMADB_DONE1 is off and DMADB_REQ is on, stay in this state and wait for DMADB_REQ to be off.
If neither DMADB_DONE1 nor DMADB_REQ on, set DMAC_DMADB_OPCODE TO 01, tfr (transfer) DATA HOLD REG to DMADB_DATA_REG, tfr DMADB_ADDR1 to DMADB_ADDR_REG, tfr DMAC_MASK to DMADB_MASK and reset DMAC_MASK, tfr DMAC_CHN_NBR to DMADB_CHN_NBR, go to state 0.
If DMA_B_REQ on, stay in this state until it is off.

State 7: DMA_A re-examines transmit byte count. If count is zero, tfr ECI and EFI respectively to ECD and EFC bits of TDFSW. Else, set ECD and EFD to zero. Set DMA_B_REQ and DMA_C_REQ on, set DMA_B_OPCODE to 100, set DMA_C_OPCODE to 11, tfr RLA_TBC REG to DATA HOLD REG, go to state 3.

State 8: Wait for DCB Fetch from DMADB
If DMADB_DONE2 asserted by DMADB, check MIO_DMAC_PE for data parity error indication. If parity error indicated, tfr DMADB_MASK to DMAC_MASK and reset DMADB_MASK, trf DMADB_CHN_NBR to DMAC_CHN_NBR, set PE bit (bit 9) in DATA HOLD REG, store latter to TDCR1, set DMA_B_REQ, set DMA_B_OPCODE to 110, go to state 4.
If no parity error, check if new DCB is empty (transmit byte count of 0). If empty, set NDI bit in TDFSW and go to state 10.
If new DCB not empty, tfr DMADB_ADDR2 to DMADB_ADDR_REG, increment current address in CURRENT ADDR REG, decrement byte count in RLA_TBC_REG, tfr DMADB_MASK to DMAC_MASK (without resetting DMADB_MASK), set DMAC_DMADB_OPCODE to 00, tfr DMADB_CHN_NBR to DMAC_CHN_NBR, set DMADB_REQ bit, set TOPQ and TBC of TDFSW, go to state 11.
If DMADB_DONE2 not asserted, stay in this state until it is. While in this state, react to DMADB_DMAC_ACK0 to cause transmit data buffer address on DMADB_DATA bus to be loaded into CURRENT ADDR REG, react to DMADB_DMAC_ACK1 to cause DMADB_DATA (ECI, EFI and next DCB address) to be loaded into RFA_NDA_REG, react to DMADB_DMAC_ACK2 to cause transmit byte count on DMADB_DATA bus to be loaded into RLA_TBC_REG.

State 9: Wait for DMA_B state machine to be done. If both DMA_B_REQ and DMA_C_REQ off, go to state 0. Else, stay in this state and wait for both to be off.

State 10: Check status of ECI, EFI when transmit byte count of new DCB is zero. If either ECI or EFI is on, set DMA_B_OPCODE to 110, and tfr ECI and EFI respectively to ECD and EFD. Else, set DMA_B_OPCODE to 100, and reset ECD and EFD. In either case, set both DMA_B_REQ and DMA_C_REQ on, set DMA_C_OPCODE to 10, and go to state 9.
State 11: Reexamine Transmit Byte Count of new DCB after it has been decremented. If byte count 0 then, and either ECI or EFI is on, tfr ECI and EFI respectively to ECD and EFD to TDFSW. Else, set ECD and EFD to 0. Set both DMA_B_REQ and DMA_C_REQ on, DMA_B_OPCODE to 100, DMA_C_OPCODE to 10, and go to state 9.

11.1.2 DMA B State Machine

This state machine performs DMAC operations relative to FIFO RAM in accordance with DMA_B_OPCODE functions set by DMA_A. States, functions and state transitions of this state machine are:

State 0: Enter this state from other states or if reset. In this state, poll DMA_B_REQ bit. If bit is on, assert DMAC_FIFO_REQ and go to state 1. Else, stay in this state.
State 1: Access FIFO RAM according to DMA_B_OPCODE.
  If FIFO_DMAC_ACK asserted, decode DMA_B_OPCODE, apply associated operation request to FIFO RAM, and check for FIFO_ERROR if DMA_B_OPCODE called for read access.
  If DMA_B_OPCODE is 000, request 2 word read from rcv chl space, load FIFO_DATA into CURRENT ADDR REG, if FIFO_ERROR on set FIFO_PE bit in functional register, go to state 2.
  If opcode 001, request 1 word wirte to receive chl space, reset DMA_B_REQ, go to state 0.
  If opcode 010, request 1 word write to rcv chl, reset that chl's request bit in DMARQ, reset DMA_B_REQ, assert DMAC_DMARQ_RCV_RESET, go to state 0.
  If opcode 011, request read transmit channel TDCR1, load FIFO_DATA into RLA_TBC REG, if parity error indicated set parity indication to A state machine, reset DMA_B_REQ, go to state 0.
  If opcode 100, request write access for writing updated transmit byte count to current channel's TDCR1, reset DMA_B_REQ, go to state 0.
  If opcode 101 or 110, request 1 word write of transmit data or transmit byte count (TDCR2 or TDCR1), respectively, present associated data or byte count (at DMAC_FIFO_DATA), reset DMA_B_REQ, and assert DMAC_DMARQ_XMIT_RESET. Go to state 0.
State 2: Wait for 2nd ACK relative to 2 word read request. If FIFO_DMAC_ACK asserted, check for data parity on second word read. If parity error indicated, set FIFO_PE bit in FR (to notify A state machine). Transfer FIFO_DATA bus to DATA HOLD REG, reset DMA_B_REQ, to to state 0.

11.1.3 DMA C State Machine

This state machine performs DMAC operations relative to FIFO RAM in accordance with DMA_B_OPCODE functions set by DMA_A. States, functions and state transitions of this state machine are:

State 0: Entered from other states or when DMAC reset. In this state, poll state of DMA_C_REQ. If bit is on, assert DMAC_DMACR_REQ and go to state 1. Else, stay in this state.
State 1: If DMACR_DMAC_ACK asserted, decode DMA_C_OPCODE for determining request to present to DMACR and if the request calls for read operation check for parity error.
  If opcode 00, request 2 word read relative to receive chl space, load first DMACR_DATA word into RFA_NDA, and RLA_TBC registers. If parity error indicated, set DMACR_PE bit in FR. Go to state 2 to handle second word.
  If opcode 01, request 2 word read relative to transmit chl space, load first word from DMACR_DATA bus into CURRENT ADDR REG. If parity error indicated, set DMACR_PE bit in FR. Go to state 2.
  If opcode 10, request 2 word write relative to transmit chl, load content of RFA_NDA into CURRENT ADDR REG, and go to state 2.
  If opcode 11, request 1 word write relative to transmit chl TDCR3 (containing Transmit Data Buffer Address TDBA), reset DMA_C_REQ, and go to state 0.
State 2: Process 2nd word tfr of a 2 word tfr request. If DMACR_ACK asserted, decode DMA_C_OPCODE and apply corresponding request to DMACR.
  If opcode 00 (reading second word rel to rcv chl), check for parity error and if indicated set DMACR_PE bit in FR. Load DMACR_DATA into RBCA register, and part into RLA_TBC REG (high order last address). Reset DMA_C_REQ and go to state 0.
  If opcode 01 (reading second word rel to xmit chl), check for parity error and if indicated set DMACR_PE bit in FR. Load DMACR_DATA into RFA_NDA REG. Reset DMA_C_REQ, and go to state 0.
  If opcode 10 (writing second word), reset DMA_C_REQ, and go to state 0.

11.1.4 RCV ARB State Machine

Polls request bits in DMARQ receive queue. States and operations are:

State 0: Enter from state 1 or if reset. In this state, poll receive queue request bits in sequence defined by internal RV—CNT count (3 bits). If polled bit is active and unmasked, go to state 1. Else, stay in this state and increment RV—CNT to poll next bit.

State 1: Wait for DMA—A acknowledge signal indicating acceptance of the active request bit by DMA—A, increment RV—CNT and go to state 0.

11.1.5 XMIT ARB State Machine

Polls request bits in DMARQ transmit queue. States and operations are:

State 0: Enter from state 1 or if reset. In this state, poll transmit queue request in sequence defined by internal TX—CNT (3 bits). If polled bit active and not masked, go to state 1. Else, stay in this state, increment internal count and poll next request bit.

State 1: Wait for DMA—A to acknowledge acceptance of the request. When acknowledged, increment internal count and return to state 0.

11.2 DMADB State Machines

Controls operations of DMADB. States and associated operations are:

State 0: Reset state. In this state, the DMADB—REQ bit is constantly monitored. If bit is on, decode DMAC—DMADB—OPCODE for definition of required task. If opcode indicates one word to be fetched from host memory, assert DMAC—MIO—RD1 and go to state 1.
If opcode indicates one word write to host memory, assert DMAC—MIO—WR1 and go to state 2.
If opcode indicates DCB fetch (3 words), assert DMAC—MIO—RD3, and go to state 3.

State 1: When MIO—DMAC—ACK0 is asserted, latch data on MIO—DATA bus into DMADB—DATA—REG and wait for MIO—DMAC—DONE assertion by MIO. When latter indication is received, reset DMADB—REQ, set DMADB—DONE1 (indicating valid data has been latched in DMADB—DATA—REG; which must be removed to DMAC before DMADB can be reused). Next state is state 0. If an error occurs in the transfer, MIO requests re-transfer, and if the error condition is not resolved a hard error condition is signalled back to the host processor.

State 2: When MIO—DMAC—ACK is asserted, data on DMAC—MIO—DATA bus has been transferrd to host memory, and DMADB—MASK—RESET is asserted to reset the corresponding mask bit in the DMAC FR. Also DMADB—DMARQ—RESET is asserted to reset the respective rcv chl's request.

State 3: Handle 3-word DCB fetch. As each MIO—DMAC—ACKn is received (n=0, 1, 2), it is passed to DMAC and data on the MIO—DATA bus is latched in DMADB—DATA—REG (DMAC has prepared for receipt of 3 words back-to-back and will automatically transfer the contents of DMADB—DATA—REG to internal DMAC registers).
When MIO—DMAC—DONE is detected, assert DMADB—DONE2, reset DMADB—REQ, and return to state 0.

11.3 MIO Micro Channel Bus State Machine

States, operations and transitions relative to Micro Channel and DMAC are:

State 0: Idle state:
This state entered either when control of bus is released of IIM is reset. Wait for request from DMAC (DMAC—MIO—RD1/WR1/RD3). Upon getting request, make sure bus is not immediately in arbitration cycle, then go to state 1. If bus arbitration cycle in progress, wait for end of cycle and then go to state 1.

State 1: Arbitration state
In this state it is safe for MIO to arbitrate for bus when ARB—GNT goes high. However, since cycle can be as short as 100 microseconds, MIO gates ARB—GNT to immediately start the cycle; and maintains the line high until bus control is obtained and released. When MIO gains control of the bus, status is driven out on the bus. Stay in this state until control of the bus is won. Upon winning, go to state 2.

State 2: Determine availability of slave device (system memory unit)
If device is 16-bit device and connected to the bus, continue; else, go to state 15 and signal hard error. Device width is checked via DS16—RTN and presence of the slave device on the bus is checked via SFDBC—RTN. If DS16—RTN not asserted within allowed timeout, go to hard error state 15. If SFDBk—RTN not asserted go to state 15. Otherwise, go to state 3.

State 3: Strobe ADL (Address Decode Line) active. Go to state 5.

State 5: Strobe CMD
Strobe CMD (Command Line) active. Wait for CHRDY—RTN and deactivate CMD and ADL, activate DPAREN (Data Parity Enable). Upon detection of CHRDY—RTN, go to state 6. If timeout condition occurs while waiting for CHRDY—RTN, set error indication to DMAC and go to state 15.

-continued

State 6: Strobe CMD
Strobe CMD low for required bus time (2 internal clock cycles; about 90 nanoseconds), deactivate status bits and go to next state (state 7). The address is changed in this state, followed by gating out of the data (ensuring proper hold time for the address). Next state is state 7, unless parity occurs (in which case, next state is state 15 and DMAC_PE is activated.
If DMAC request is a DCB Fetch (DMAC_MIO_RD3), and a valid word has just been received from the slave device (two 16-bit transfers without parity error), return acknowledge MIO_DMAC_ACKn (n=0, 1 or 2) to DMAC, corresponding to the position of the received word (in a DCB Fetch, three words are read from system memory back-to-back, and acknowledged with ACK0, ACK1, ACK2, respectively).
If request is a one word transmit data fetch (DMAC_MIO_RD1) or a one word receive data store (DMAC_MIO_WR1), and a word access has just been completed (two 16-bit transfers on the bus), acknowledge with MIO_DMAC_ACK0.
Go to state 7.

State 7: Deactive CMD
CMD deactivated but Data kept valid on write operations. New status put out if second 16 bit access needed. If second access needed, or if in midst of DCB fetch, go to state 3 and loop through states 3-7; else go to state 8.

State 8: Wait for next request/release bus (bus hold operation)
Timer indicates elapsed time since bus preempt signal first active during this period of MIO control of bus.
If DMAC returns with another request within set time (4 internal MIO clock cycles), start requested operation on bus provided elapsed time less than 4 microseconds. If elapsed time between 4 and 6 microseconds, start requested operation only if it is not a DCB Fetch (i.e. only if it is DMAC_MIO_RD1 or DMAC_MIO_WR1).
If DMAC does not return with another request in set time (4 internal cycles), or if elapsed time greater than 6 microseconds, release bus.
If IIM operating in accordance with "Fairness" rules of bus architecture, go to state 9, else to to state 0 and re-arbitrate when appropriate.

State 9: Hog Pen
State requiring MIO to wait until all prior bus access requests from other devices have been granted. Asynchronous IIM logic monitors the bus to determine when all other devices have had chance at access, and then signals EXIT_HOG_PEN to MIO. At signal, go to state 0.

State 15: Hard fault/error state. Bus is released and MIO_DMAC_DONE asserted. Error condition reported. Wait until all requests have been removed, and enter either inactive state or go to state 0 and wait for another request.

We claim:

1. A multi-channel DMA (Direct Memory Access) controller unit for controlling access to memory in a data processing system, via a system bus connectable to plural other device and controller units, said DMA controller unit and other units being required to arbitrate for access to said bus, said DMA controller unit containing plural internal channels for transferring data between said system memory and plural external devices having no direct connection to said bus and operating in asynchronous relation to said bus, said DMA controller unit comprising:

internal memory means, said internal memory means containing storage spaces assigned to said internal channels for storing data in transit through respective channels, and additional storage spaces assigned to said internal channels for storing control information defining operations to be conducted relative to respective channels and said system memory;

bus control means coupled to said system bus for arbitrating for and controlling said bus, and for operating through said bus to transfer data between said internal channels and said system memory;

DMA control (DMAC) means containing respective DMAC buffer registers for storing data and control information relative to any one of said internal channels; said DMAC means being coupled to said internal memory means for transferring data and control information between said DMAC buffer registers and said internal memory means relative to one said internal channel at a time; said DMAC means including means for performing logical operations relative to individual ones of said internal channels that are defined by control information held in said DMAC buffer registers, said logical operations including operations for preparing said bus control means for gaining control of said system bus and for transferring data through said bus between an internal channel and said system memory; and DMA data buffer (DMADB) means containing respective DMADB buffer registers for holding data and control information associated with any one of said internal channels; said DMADB means interfacing between said bus control means and said DMAC means for transferring data and control information between its DMADB buffer registers and the DMAC buffer registers of the DMAC means, and for transferring data and control information between said DMADB buffer registers and said bus control means; said DMAC and DMADB means being capable of operating in a pipelined manner to sustain data transfer actions between said internal memory means and said bus control means relative to more than one internal channel at a time; said DMADB means and bus control means operating in tight coupled synchronism, and both operating in relative asynchronism to said DMAC means; so that while said DMAC means and said DMADB means are cooperating to prepare said DMADB means for a data transfer operation relative to one internal channels, said DMADB means and bus control means can be operating to conduct a data transfer operation between another internal channel and said system memory via said system bus.

2. A multi-channel DMA controller unit in accordance with claim 1 wherein:

said DMAC means comprises swap control means for controlling cross-directed transfers of data and control information control information, between said DMAC buffer registers and said DMADB buffer registers, in which signals representing data and control information assigned to to one internal channel are transferrable in one direction between said DMAC and DMADB buffer registers, while, at the same time, signals representing data and control information assigned to another internal channel are transferrable in the opposite direction between the same buffer registers, whereby said DMAC, DMADB and bus control means are enabled to perform operations relative to said one and another internal channels in a pipelined manner.

3. A multi-channel DMA controller unit in accordance with claim 1, including:

DMA request queueing (DMARQ) means for processing signals representing requests to initiate actions, relative to internal channels associated with respective signals, for transferring data relative to respective channels between said memory means and said system memory, said DMARQ means containing DMARQ register queues, for storing said requests, and means coupled between said DMARQ register queues and said DMAC means for presenting said stored requests to said DMAC means;

said DMAC means including means means for selecting requests presented by said DMARQ request presenting means for attention, in a prearranged priority sequence and for initiating operations, relative to internal channels associated with the selected requests, for transferring data in respective channels between memory means and said system memory, via said bus, whereby data is transferrable between said memory means and said system memory at a pace that can be coordinated with operations in said internal channels relative to respective said external devices and timing constraints on said system bus.

4. A multi-channel DMA controller unit in accordance with claim 1 wherein said control information stored in said memory means, in association with each currently active internal channel includes length count information indicating a number of data units (e.g. bytes) remaining to be transferred between said memory means and said system memory, address information pointing to a space in system memory to or from which a next unit amount of data (e.g. byte or word or doubleword) is to be transferred, that unit amount representing all or part of a block of data to be transferred, and a chaining indication denoting whether or not the operation is extendable by chaining when the transfer of the data block has been completed; said DMAC means including:

means operating while a said unit amount of data is being transferred relative to a said internal channel for incrementally modifying said length count and address information stored in said memory means for that internal channel, so that the incrementally modified information indicates the number of units of data remaining to be transferred in the respective channel and the address in system memory to or from which the next unit amount of data in the block is to be transferred for the respective channel;

means for determining, from said incrementally modified information, when a last unit amount of data is about to be transferred, relative to an internal channel with which the information is associated, that unit amount transfer completing transfer of a block of data;

means responsive to indication by said determining means that a last unit of data is being transferred for examining said chaining indication to distinguish if chaining is currently allowed or disallowed for the respective internal channel; and means responsive to detection that chaining is allowed for initiating an operation by said DMADB and bus control means to retrieve new length count and address control information, from said system memory for extending operations in the respective internal channel relative to another block of data; said operation to retrieve said new control information being initiated at the same time that said last unit amount of data is being transferred relative to said system memory, whereby the operations needed to complete the transfer of said last unit amount of data and the retrieval of said new control information are executable in a single uninterrupted operation relative to said system bus.

5. A multi-channel DMA controller unit in accordance with claim 4 wherein, in order to conduct said chaining operations efficiently, said retrieved new control information is required to be passed through said DMAC buffer registers to said memory means while the incrementally modified control information of the same internal channel is still stored in said registers for use in controlling the transfer of said last unit amount of data in the same channel, and wherein the number of DMAC buffer registers and DMADB buffer registers is held to a minimum by providing only enough capacity in said registers to sustain, simultaneously, either a last unit amount data transfer and a chaining operation in only one internal channel or pipelined data transfer operations in more than one internal channel.

6. A multi-channel DMA controller unit in accordance with claim 5 wherein upon retrieval of said new control information, and while said new control information is passing through said DMAC buffer registers en route to being stored in said memory means, said DMAC means is adapted to immediatey condition the DMADB and bus control means to initiate a first unit amount data transfer operation defined by said retrieved new control information and simultaneously to incrementally modify said new control information.

7. A DMA controller unit in accordance with claim 1 wherein said bus control means comprises:

means for detecting an idle condition in the respective controller unit, after the bus control means has finished an operation initiated by said DMAC means relative to one of said internal channels and the bus control means still has control of the bus, and the bus control means also has not received a request for another operation from said DMAC means for a predetermined interval of time, said interval representing a fraction of the time required by said DMAC means to prepare for another operation; and means activated upon detection of said idle condition for conditioning said bus control means to release control of said bus.

8. A DMA controller unit in accordance with claim 7 wherein control information used relative to each said internal channel is arranged in control blocks which are chainable and which are retrievable from said system memory only by means of plural cycles of information transfer operations on said bus, wherein efficient operation of said DMA controller and said bus require that when a chained control block is to be retrieved it should be retrieved in an uninterrupted series of operations of said bus, wherein data is efficiently transferrable over said bus in single discrete operations of said bus, and wherein said DMAC means includes means for indicating to said bus control means when plural uninterrupted operations of said bus are required relative to a said internal channel, as when retrieval of a said chained control block is needed, or when one or more operations of said bus are needed, as when transfers of data units are needed; and wherein said bus control means includes:

timer means responsive to a preempt signal on said bus while said bus control means has control of said bus for initiating a timeout of predetermined duration; said preempt signal indicating requirement by means external to said DMA controller for use of said bus;

means enabled while the output of said timer represents an elapsed time less than a first predetermined time, and responsive to indication form said DMAC means, during that elapsed time, that either a data unit is to be transferred or that a chained control block is to be retrieved, for conditioning said bus control means to initiate an operation relative to said bus corresponding to the respective DMAC indication;

means responsive to the output of said timer representing an intermediate elapsed time greater than said first predetermined time but less than a second predetermined time, and responsive to indication from said DMAC during that second time that a data transfer operation is needed, for conditioning said bus control means to initiate an data transfer operation associated with the respective indication, and to ignore other indication from said DMAC means of need for retrieval of a chained control block; and wherein said means for conditioning said bus control means to release control of said bus is effective to condition said release either in response to detecting said idle condition or in response to detecting that said bus control means has finished an operation relative to said bus and that said timer elapsed time is equal to or greater than said second predetermined time.

9. A multi-channel DMA controller unit in accordance with claim 1 wherein:

said buffer memory means comprises first and second Random Access Memories (RAM's) which are separately accessible to said DMAC means;

said first RAM having a pair of unit storage spaces dedicated to each of said channels for storing a unit of data and a unit of control information relative to the associated channel; said unit of control information comprising a portion of a command for controlling operations relative to the respective channel, said command consisting of 3 units of control information;

said second RAM having a pair of unit storage spaces dedicated to each of said channels for storing two units of control information constituting a remaining portion of the command associated with the respective channels; and said DMAC means comprises means for operating simultaneously relative to said first and second RAM memories to concurrently retrieve therefrom all 3 units of control information constituting a command associated with one of said internal channels; said command being retrieved and placed in the internal registers of said DMAC means in about the same time, on the average, as the time needed by said DMADB and bus control means to carry out an operation relative to another one of said channels via said bus, while said bus control means has control of said bus;

whereby said DMAC means can act to prepare for an operation relative to one channel at about the same time that said DMADB and bus control means are carrying out an operation relative to another channel.

10. A multi-channel DMA controller unit in accordance with claim 9 wherein:

said DMAC means comprises means enabled when the internal registers of said DMAC means are prepared with command information associated with one channel for detecting when said DMADB and bus control means have completed an operation relative to another channel; and means responsive to detection of completion of said operation for controlling a swap transfer operation between internal registers of said DMAC means and said DMADB means, said swap transfer operation causing said internal registers in said DMAC means and said DMADB means to cross exchange their contents simultaneously;

thereby preparing said DMAC means to conclude an operation in said another channel, by writing the control information of that channel into said first and second RAM's, while at the same time preparing said DMADB means carry out an operation in said one channel and said system memory means via said bus control means.

11. A multi-channel DMA controller in accordance with claim 10 wherein:

said 3 units of command information stored in said first and second RAMs relative to said one channel are associated in a chained relation to another 3-unit block of command information stored in said system memory relative to said one channel; and said DMAC means comprises;

means for detecting when all data transfers relative to said one channel, that are defined by the 3 units stored in said first and second RAM's, are about to be completed; and means responsive to detection that all said transfers are about to be completed for immediately initiating cooperative actions by said DMADB means and bus control means to retrieve the associated another 3 unit block of chained command information from said system memory, in one uninterruptible series of operations on said system bus during which the internal registers of both said DMADB and DMAC means are effectively dedicated exclusively to that series of operations.

12. A DMA (direct memory access) controller unit, containing multiple internal channels through which data can be transferred relative to multiple external devices, said internal channels having real time operational constraints associated with the devices, said unit controlling access to a bus and memory that are part of a data processing system which is not directly accessible to said external devices, said bus operating in a contention mode in which said DMA controller unit is required to arbitrate with other controller and device adapter units for assuming control of the bus, said bus having access time constraints associated with said contention mode operation that may potentially conflict with said real time constraints if said internal channels are served without time overlap by said DMA controller unit, said DMA controller unit comprising:

a random access memory (RAM) buffer store, having space allocated to each said internal channel for storing control information of each channel;

first means coupled to said RAM store, and containing internal registers, for transferring control information and data between said store and said internal registers, said first means being time shared by said internal channels for holding control information associated with one of said channels at a time and data in transit through the associated channel, between said RAM store and said data processing system memory via said bus;

second means coupled between said first means and said bus, and containing internal registers usable in behalf of one said internal register at a time, for receiving portions of said control information from said first means and for operating in response to said portions to control said bus and to transfer data between said first means and said system memory, via said bus and the internal registers in said second means;

said registers in said first and second means forming a pipeline in which, at any time, data transfer actions can be sustained simultaneously relative to more than one of said internal channels; and third means operating relative to said first and second means to cause said first and second means to swap control information and data at discrete instants of time, in order to enable said second means to continue an action begun by said first means relative to one of said internal channels, and simultaneously enable said first means to continue an action that was being performed by said second means relative to another one of said internal channels; whereby said first and second means can operate in time overlap, relative to respective parts of said pipeline, to perform actions in both said one and another internal channels for transferring data between said RAM store and said system memory, and thereby complete said actions relative to both said one and another internal channels in less time than would otherwise be required if the same actions had to be handled separately.

* * * * *